United States Patent
Chow et al.

(10) Patent No.: US 8,108,590 B2
(45) Date of Patent: Jan. 31, 2012

(54) MULTI-OPERATION WRITE AGGREGATOR USING A PAGE BUFFER AND A SCRATCH FLASH BLOCK IN EACH OF MULTIPLE CHANNELS OF A LARGE ARRAY OF FLASH MEMORY TO REDUCE BLOCK WEAR

(75) Inventors: David Q. Chow, San Jose, CA (US); Frank Yu, Palo Alto, CA (US); Charles C. Lee, Cupertino, CA (US); Abraham C. Ma, Fremont, CA (US); Ming-Shiang Shen, Taipei Hsien (TW)

(73) Assignee: Super Talent Electronics, Inc., San Jose, CA (US)

( * ) Notice: Subject to any disclaimer, the term of this patent is extended or adjusted under 35 U.S.C. 154(b) by 898 days.

(21) Appl. No.: 12/139,842

(22) Filed: Jun. 16, 2008

(65) Prior Publication Data

US 2008/0250195 A1     Oct. 9, 2008

Related U.S. Application Data

(63) Continuation-in-part of application No. 09/478,720, filed on Jan. 6, 2000, now Pat. No. 7,257,714, and a continuation-in-part of application No. 11/624,667, filed on Jan. 18, 2007, now abandoned, and a continuation-in-part of application No. 12/054,310, filed on Mar. 24, 2008, now Pat. No. 7,877,542, and a continuation-in-part of application No. 10/707,277, filed on Dec. 2, 2003, now Pat. No. 7,103,684, and a continuation-in-part of application No. 11/309,594, filed on Aug. 28, 2006, now Pat. No. 7,383,362, and a continuation-in-part of application No. 12/035,398, filed on Feb. 21, 2008, now Pat. No. 7,953,931, and a continuation-in-part of application No. 11/770,642, filed on Jun. 28, 2007, now Pat. No. 7,889,544, and a continuation-in-part of application No. 11/748,595, filed on May 15, 2007, now Pat. No. 7,471,556, and a continuation-in-part of application No. 12/025,706, filed on Feb. 4, 2008, now Pat. No. 7,886,108, and a continuation-in-part of application No. 11/871,011, filed on Oct. 11, 2007, now Pat. No. 7,934,074, and a continuation-in-part of application No. 11/458,987, filed on Jul. 20, 2006, now Pat. No. 7,690,030, and a continuation-in-part of application No. 10/818,653, filed on Apr. 5, 2004, now Pat. No. 7,243,185, and a continuation-in-part of application No. 12/128,916, filed on May 29, 2008, now Pat. No. 7,552,251, and a continuation-in-part of application No. 10/761,853, filed on Jan. 20, 2004, now abandoned.

(51) Int. Cl.
*G06F 12/02* (2006.01)

(52) U.S. Cl. ................ 711/103; 711/154; 711/E12.002; 711/E12.098

(58) Field of Classification Search ........................ None
See application file for complete search history.

(56) References Cited

U.S. PATENT DOCUMENTS

| 2007/0028034 A1* | 2/2007 | Nishihara | 711/103 |
|---|---|---|---|
| 2007/0143560 A1* | 6/2007 | Gorobets | 711/170 |
| 2008/0022163 A1* | 1/2008 | Tanaka et al. | 714/710 |
| 2008/0082727 A1* | 4/2008 | Wang | 711/103 |
| 2008/0307192 A1* | 12/2008 | Sinclair et al. | 711/218 |
| 2009/0240868 A1* | 9/2009 | Tan et al. | 711/103 |

* cited by examiner

*Primary Examiner* — Michael Krofcheck
(74) *Attorney, Agent, or Firm* — Stuart T. Auvinen; gPatent LLC

(57) ABSTRACT

A flash system has multiple channels of flash memory chips that can be accessed in parallel. Host data is assigned to one of the channels by a multi-channel controller processor and accumulated in a multi-channel page buffer. When a page boundary in the page buffer is reached, the page buffer is written to a target physical block if full, or combined with old data fragments in an Aggregating Flash Block (AFB) when the logical-sector addresses (LSA's) match. Thus small fragments are aggregated using the AFB, reducing erases and wear of flash blocks. The page buffer is copied to the AFB when a STOP command occurs. Each channel has one or more AFB's, which are tracked by an AFB tracking table.

21 Claims, 24 Drawing Sheets

AGGREGATING FLASH BLK (AFB)
TRACKING TBL   350

| | PHY BLK # | DATA VAL FLAG | LAST PAGE# | TARGET BLK LSA |
|---|---|---|---|---|
| AFB #1 | 1030 | 1 | 60 | 00101101 |
| AFB #2 | 1032 | 1 | 10 | 00101111 |
| AFB #3 | 1034 | 0 | 30 | 00101011 |
| ⋮ | ⋮ | ⋮ | ⋮ | ⋮ |
| AFB #N | 1039 | 0 | 0 | 00000000 |

FIG. 4

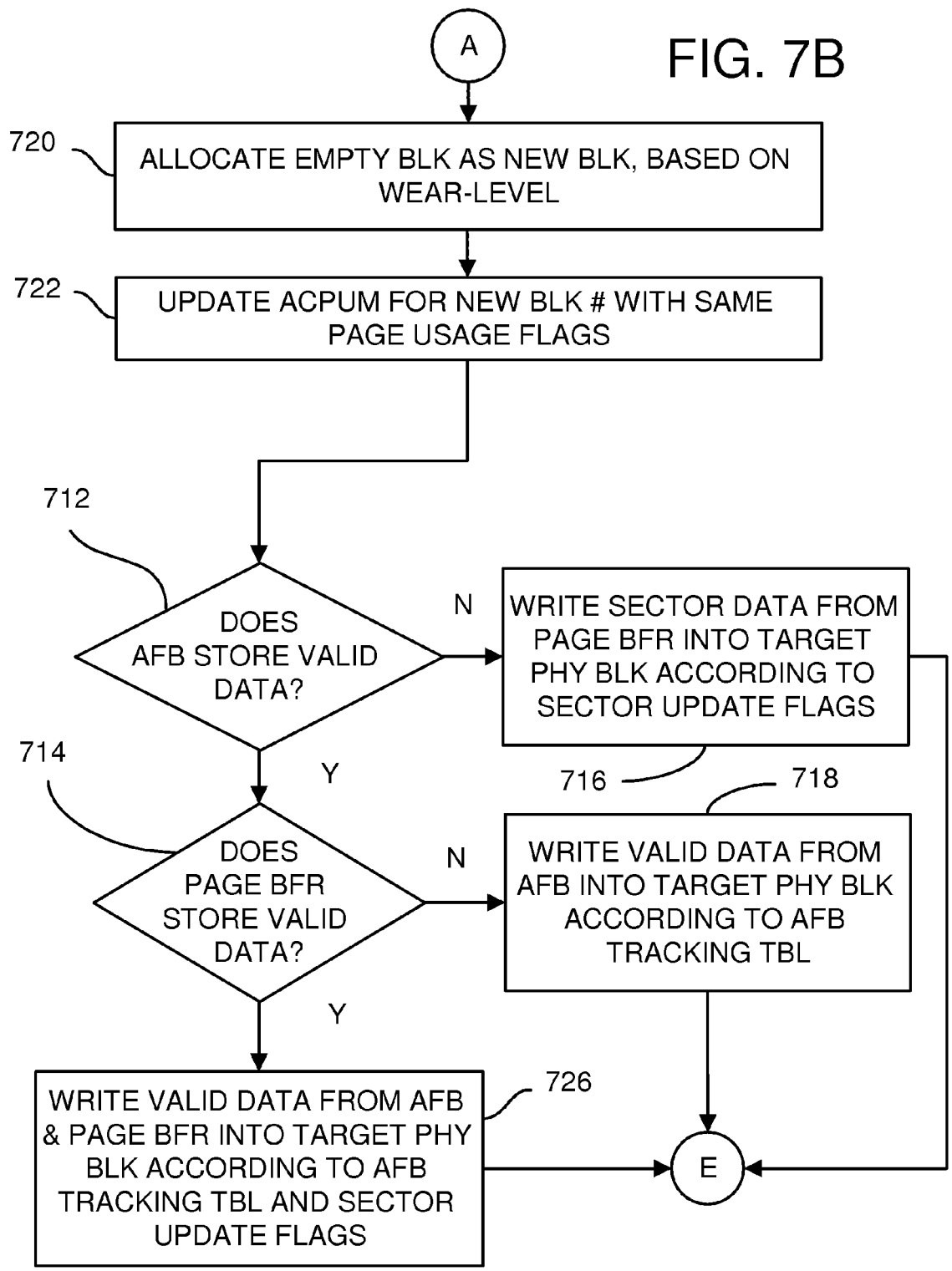

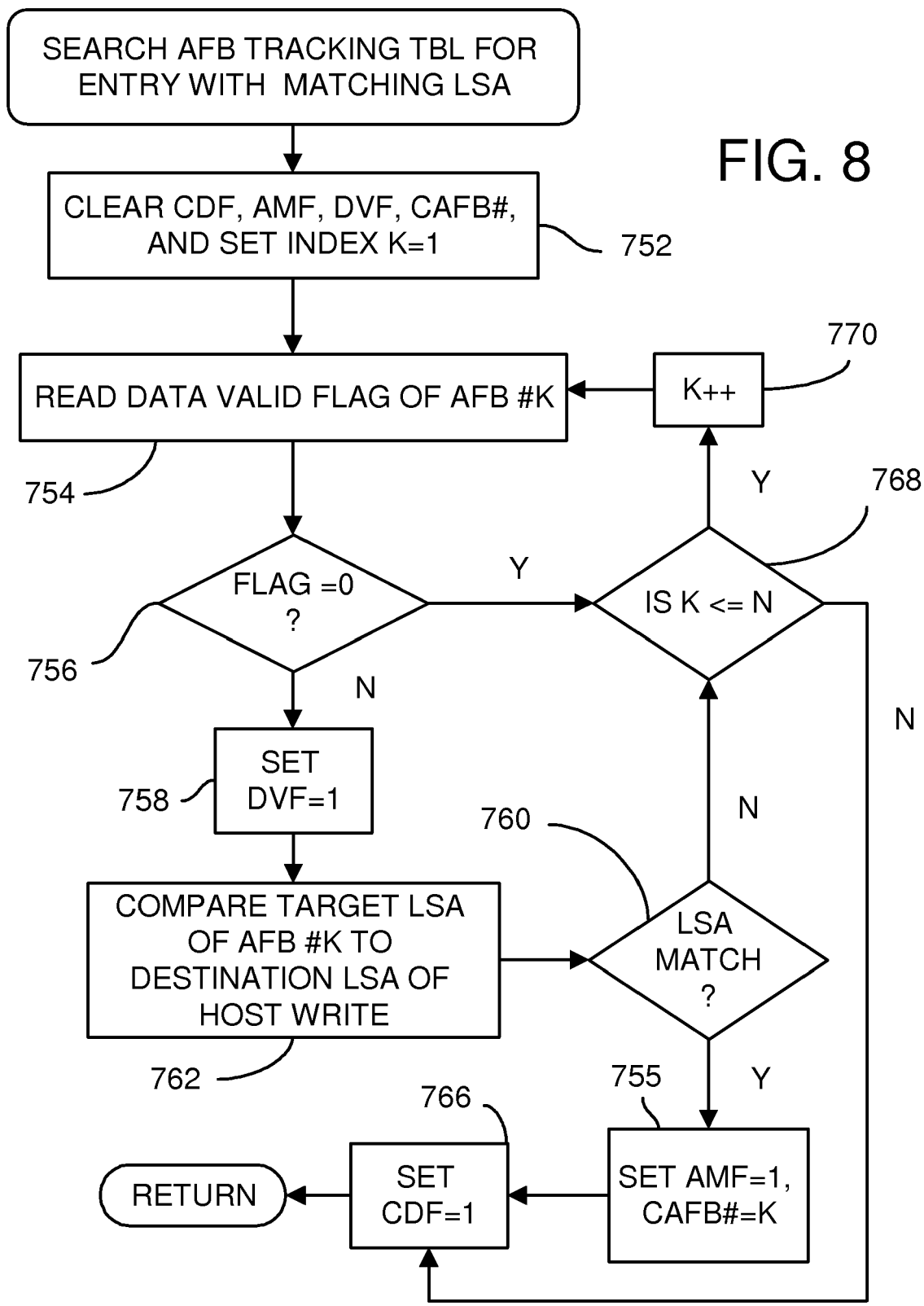

FIG. 12A

AGGREGATING FLASH BLK (AFB) TRACKING TBL

| 350 | PHY BLK # | DATA VAL FLAG | LAST PAGE# | TARGET BLK LSA |
|---|---|---|---|---|
| AFB #1 | 1030 | 0 | 20 | 00000000 |
| AFB #2 | 1032 | 0 | 60 | 00000000 |
| AFB #3 | 1034 | 0 | 10 | 00000000 |
| AFB #4 | 1036 | 0 | 0 | 00000000 |
| AFB #5 | 1038 | 0 | 0 | 00000000 |
| AFB #6 | 1040 | 0 | 0 | 00000000 |

FIG. 12B

AGGREGATING FLASH BLK (AFB) TRACKING TBL

| 350 | PHY BLK # | DATA VAL FLAG | LAST PAGE# | TARGET BLK LSA |
|---|---|---|---|---|
| AFB #1 | 1030 | 1 | 21 | 00100100 |
| AFB #2 | 1032 | 0 | 60 | 00000000 |
| AFB #3 | 1034 | 0 | 10 | 00000000 |
| AFB #4 | 1036 | 0 | 0 | 00000000 |
| AFB #5 | 1038 | 0 | 0 | 00000000 |
| AFB #6 | 1040 | 0 | 0 | 00000000 |

FIG. 12C

AGGREGATING FLASH BLK (AFB) TRACKING TBL

| 350 | PHY BLK # | DATA VAL FLAG | LAST PAGE# | TARGET BLK LSA |
|---|---|---|---|---|
| AFB #1 | 1030 | 1 | 21 | 00100100 |
| AFB #2 | 1032 | 1 | 61 | 00010010 |
| AFB #3 | 1034 | 0 | 10 | 00000000 |
| AFB #4 | 1036 | 0 | 0 | 00000000 |
| AFB #5 | 1038 | 0 | 0 | 00000000 |
| AFB #6 | 1040 | 0 | 0 | 00000000 |

FIG. 12D

AGGREGATING FLASH BLK (AFB) TRACKING TBL

| 350 | PHY BLK # | DATA VAL FLAG | LAST PAGE# | TARGET BLK LSA |
|---|---|---|---|---|
| AFB #1 | 1030 | 1 | 21 | 00100100 |
| AFB #2 | 1032 | 1 | 61 | 00010010 |
| AFB #3 | 1034 | 1 | 11 | 00111100 |
| AFB #4 | 1036 | 0 | 0 | 00000000 |
| AFB #5 | 1038 | 0 | 0 | 00000000 |
| AFB #6 | 1040 | 0 | 0 | 00000000 |

FIG. 13A

AGGREGATING FLASH BLK (AFB) TRACKING TBL

| 350 | PHY BLK # | DATA VAL FLAG | LAST PAGE# | TARGET BLK LSA |
|---|---|---|---|---|
| AFB #1 | 1030 | 1 | 1 | 00010101 |
| AFB #2 | 1032 | 1 | 3 | 00101000 |
| AFB #3 | 1034 | 1 | 2 | 00011100 |
| AFB #4 | 1036 | 1 | 1 | 00110000 |
| AFB #5 | 1038 | 1 | 2 | 00100010 |
| AFB #6 | 1040 | 1 | 1 | 00100100 |

FIG. 13B

AGGREGATING FLASH BLK (AFB) TRACKING TBL

| 350 | PHY BLK # | DATA VAL FLAG | LAST PAGE# | TARGET BLK LSA |
|---|---|---|---|---|
| AFB #1 | 1032 | 1 | 3 | 00101000 |
| AFB #2 | 1034 | 1 | 2 | 00011100 |
| AFB #3 | 1036 | 1 | 1 | 00110000 |
| AFB #4 | 1038 | 1 | 2 | 00100010 |
| AFB #5 | 1040 | 1 | 1 | 00100100 |
| AFB #6 | 1042 | 1 | 0 | 01110000 |

AGGREGATING FLASH BLK (AFB) TRACKING TBL

| 350 | PHY BLK # | DATA VAL FLAG | LAST PAGE# | TARGET BLK LSA |
|---|---|---|---|---|
| AFB #1 | 1030 | 1 | 21 | 00100100 |
| AFB #2 | 1032 | 1 | 61 | 00010010 |
| AFB #3 | 1034 | 1 | 11 | 00111100 |
| AFB #4 | 1036 | 0 | 52 | 00000000 |
| AFB #5 | 1038 | 0 | 33 | 00000000 |
| AFB #6 | 1040 | 0 | 60 | 00000000 |

AGGREGATING FLASH BLK (AFB) TRACKING TBL

| 350 | PHY BLK # | DATA VAL FLAG | LAST PAGE# | TARGET BLK LSA |
|---|---|---|---|---|
| AFB #1 | 1030 | 1 | 21 | 00100100 |
| AFB #2 | 1032 | 1 | 61 | 00010010 |
| AFB #3 | 1036 | 0 | 52 | 00000000 |
| AFB #4 | 1038 | 0 | 33 | 00000000 |
| AFB #5 | 1040 | 0 | 60 | 00000000 |
| AFB #6 | 1034 | 0 | 11 | 00000000 |

MULTI-OPERATION WRITE AGGREGATOR USING A PAGE BUFFER AND A SCRATCH FLASH BLOCK IN EACH OF MULTIPLE CHANNELS OF A LARGE ARRAY OF FLASH MEMORY TO REDUCE BLOCK WEAR

RELATED APPLICATION

This application is a continuation-in-part (CIP) of U.S. patent application for "High Integration of Intelligent Non-Volatile Memory Devices", Ser. No. 12/054,310, filed Mar. 24, 2008, which is a CIP of "High Endurance Non-Volatile Memory Devices", Ser. No. 12/035,398, filed Feb. 21, 2008, which is a CIP of "High Speed Controller for Phase Change Memory Peripheral Devices", U.S. application Ser. No. 11/770,642, filed on Jun. 28, 2007, which is a CIP of "Local Bank Write Buffers for Acceleration a Phase Change Memory", U.S. application Ser. No. 11/748,595, filed May 15, 2007, which is CIP of "Flash Memory System with a High Speed Flash Controller", application Ser. No. 10/818,653, filed Apr. 5, 2004, now U.S. Pat. No. 7,243,185.

This application is also a CIP of co-pending U.S. Patent Application for "Method and Systems of Managing Memory Addresses in a Large Capacity Multi-Level Cell (MLC) based Memory Device", Ser. No. 12/025,706, filed on Feb. 4, 2008, which is a CIP application of "Flash Module with Plane-Interleaved Sequential Writes to Restricted-Write Flash Chips", Ser. No. 11/871,011, filed Oct. 11, 2007.

This application is a continuation-in-part (CIP) of co-pending U.S. Patent Application for "Single-Chip Multi-Media Card/Secure Digital controller Reading Power-on Boot Code from Integrated Flash Memory for User Storage", Ser. No. 12/128,916, filed on May 29, 2008, which is a continuation of U.S. patent application for "Single-Chip Multi-Media Card/Secure Digital controller Reading Power-on Boot Code from Integrated Flash Memory for User Storage", Ser. No. 11/309,594, filed on Aug. 28, 2006, which is a CIP of U.S. patent application for "Single-Chip USB Controller Reading Power-On Boot Code from Integrated Flash Memory for User Storage", Ser. No. 10/707,277, filed on Dec. 2, 2003, now issued as U.S. Pat. No. 7,103,684.

This application is also a CIP of co-pending U.S. patent application for "Electronic Data Flash Card with Fingerprint Verification Capability", Ser. No. 11/458,987, filed Jul. 20, 2006, which is a CIP of U.S. patent application for "Highly Integrated Mass Storage Device with an Intelligent Flash Controller", Ser. No. 10/761,853, filed Jan. 20, 2004, now abandoned.

This application is also a CIP of co-pending U.S. patent application Ser. No. 11/624,667 filed on Jan. 18, 2007, entitled "Electronic data Storage Medium with Fingerprint Verification Capability", which is a divisional patent application of U.S. patent application Ser. No. 09/478,720 filed on Jan. 6, 2000, now U.S. Pat. No. 7,257,714.

FIELD OF THE INVENTION

This invention relates to flash-memory systems, and more particularly to accumulating writes in a flash block in each of multiple flash channels.

BACKGROUND OF THE INVENTION

Flash memory is replacing hard disks and optical disks as a preferred storage medium. NAND flash memory is a type of flash memory constructed from electrically-erasable programmable read-only memory (EEPROM) cells, which have floating gate transistors. These cells use quantum-mechanical tunnel injection for writing and tunnel release for erasing. NAND flash is non-volatile so it is ideal for portable devices storing data.

However, NAND flash has limitations. In the flash memory cells, the data is stored in binary terms—as ones (1) and zeros (0). One limitation of NAND flash is that when storing data (writing to flash), the flash can only write from ones (1) to zeros (0). When writing from zeros (0) to ones (1), the flash needs to be erased a "block" at a time. Although the smallest unit for read or program can be a byte or a word, the smallest unit for erase is a block.

Single Level Cell (SLC) flash and Multi Level Cell (MLC) flash are two types of NAND flash. The erase block size of SLC flash may be 128K+4K bytes while the erase block size of MLC flash may be 256K+8K bytes. Another limitation is that NAND flash memory has a finite number of erase cycles between 10,000 to 1,000,000, after which the flash wear out and becomes unreliable.

Comparing MLC flash with SLC flash, MLC flash memory has its advantages and disadvantages in consumer applications. In the cell technology, SLC flash stores a single bit of data per cell, whereas MLC flash stores two or more bits of data per cell. MLC flash can have twice or more the density of SLC flash with the same technology. But the performance, reliability and durability may decrease for MLC flash. MLC flash clearly has more storage at a low cost so it gains popularity with consumers. But it has a lower write speed than SLC flash memory, which means that it takes a longer time to store pictures when taking snapshots. Its low performance requires a stronger wear-leveling algorithm to meet consumers' needs. In addition, the life of MLC flash memory is limited to perhaps 10,000 erase cycles. The number of partial programming (NOP) cycles in MLC flash memory is known to be one. This means that the whole block needs to be erased if the system wants to reprogram a page. Therefore, a good wear leveling algorithm is needed to solve the MLC flash reprogramming problem.

A wear leveling algorithm allows the memory controller to remap logical addresses to different physical address so that data writes can be evenly distributed. Thus the wear leveling algorithm extends the endurance of the MLC flash memory.

Block sizes are expected to increase as higher density MLC flash chips become commercially available. However, the size of the host data being stored is not expected to increase at the same rate as the block size. Thus flash blocks are less efficiently used as the flash blocks become larger, but store fixed-size pieces of host data. For example, hosts may send sectors of 512 Kbytes to be stored in larger flash blocks, wasting space in the flash block.

Flash blocks with much unused space may be combined with other such blocks to improve block storage efficiency. However, moving data around among flash blocks increases wear, as flash blocks need to be erased. Paging and disk de-fragmenting methods, which have been used for main DRAM memories and hard disks, are ineffective for flash memory due to the restricted life of flash. Such methods would quickly wear out the flash memory blocks.

A large DRAM or SRAM buffer could be used to merge writes before writing to flash, but if power is lost, the data in the write buffer may also be lost. The size of the write buffer may be prohibitive, especially as flash blocks increase in size, since the write buffer needs to have a size equal to one or more flash blocks.

Larger flash systems may use several channels to allow parallel access, improving performance. However, moving data from one channel to another during wear-leveling may decrease performance.

What is desired is a multi-channel flash system that has improved wear leveling. A MLC flash system is desired that aggregates smaller writes into flash memory so that data is not lost when power fails. A write-aggregating flash system that leverages the multiple channels of flash is desirable.

BRIEF DESCRIPTION OF THE DRAWINGS

FIG. 4 shows the AFB tracking table in more detail.

FIGS. 7A-C show a process to flush host data from the page buffer to the target physical block, and optionally combine old data fragments from the AFB to reduce wear.

FIG. 8 is a flowchart of a search procedure that searches for a matching LSA in the AFB tracking table.

FIGS. 12A-D show the AFB tracking table for the example of FIGS. 11A-B.

FIGS. 13A-B show the AFB tracking table for example C and FIGS. 14A-B.

DETAILED DESCRIPTION

The present invention relates to an improvement in flash memory systems. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Samsung's K9G8G08U0M is a typical restrictive-write MLC flash chip. It has 2K data bytes per page, plus 64 spare bytes that can be used for ECC or other management purposes. There are 128 pages per flash block in this chip. The pages must be written in page order, not in a random order. The whole block of 128 pages must be erased together.

Host writes are first accumulated in a one-page controller buffer in the controller hardware until a page is accumulated, or a page boundary is crossed. Then the full page is written from the controller buffer to a target block in flash. However, when only a partial page is accumulated in the buffer and the host transfer stops, the partial page is loaded into a special block in flash memory referred to as the Aggregating Flash Block (AFB).

When the current host address matches the address of old data fragments in the AFB, the partial page from the controller buffer can be combined with the old data fragments and stored in the AFB when the host transfer stops. When a page boundary in the controller buffer is crossed, and the buffer is not full, old data fragments in the AFB can be combined with the new host data in the partially-full controller buffer and written to a target block in flash. Otherwise, full pages from the controller buffer are written to the target block.

A large flash system can have a large combined address space. The physical flash memory can be divided into several flash channels, each with one or more flash-memory chips. Each of the flash channels is provided with its own Aggregating Flash Block (AFB). The partial-page aggregation algorithm highlighted above then can be applied to each of the flash channels.

Figure 1A:
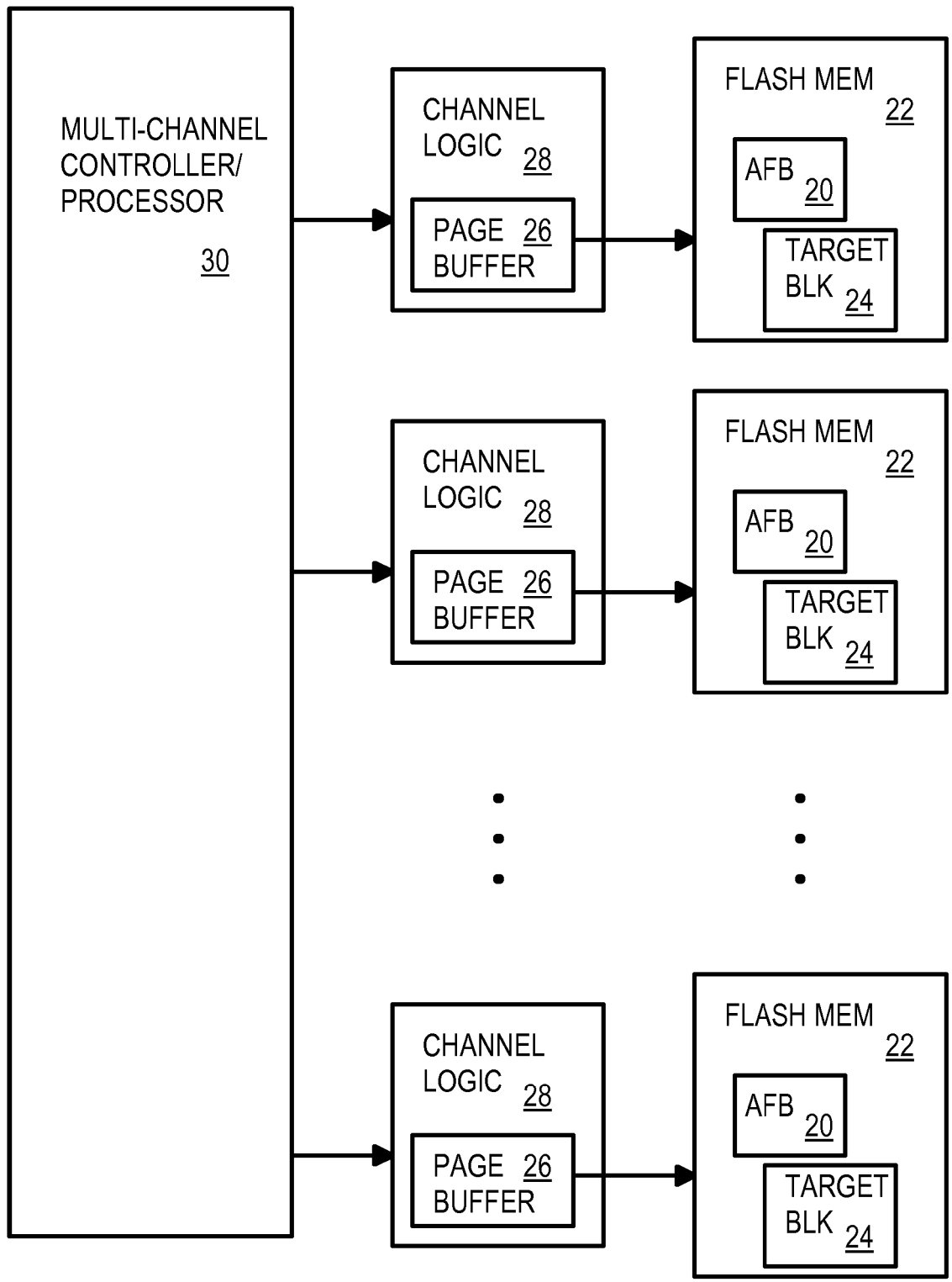
FIG. 1A shows a large flash system with multiple channels and an Aggregating Flash Block (AFB) and controller page buffer in each channel.

FIG. 1A shows a large flash system with multiple channels and an Aggregating Flash Block (AFB) and controller page buffer in each channel. Multi-channel controller processor 30 receives commands, addresses, and data from a host (not shown), either directly or through other levels of controllers and interfaces. Host addresses are assigned to on of the flash channels, and some high-level re-mapping may be performed by multi-channel controller processor 30.

Multi-channel controller processor 30 sends host accesses to one of the channels by sending the host command and address to channel logic 28, which may perform additional remapping and wear-leveling. In particular, write data from the host is accumulated in page buffer 26, which can hold one page of data. The page refers to the page size of flash memory 22. Note that different channels could have different flash memory chips and thus different page sizes.

Channel logic 28 accumulates host write data in page buffer 26 until a page boundary is crossed. When page buffer 26 is full, the entire page is directly written to the final target block in flash memory 22, such as target block 24.

When the address of old data fragments in AFB 20 matches the current host address, the old data fragments in AFB 20 can be combined with new host data in page buffer 26 to more efficiently use blocks of flash storage. When the page boundary is crossed, but page buffer 26 is not full, old data fragments stored in AFB 20 in flash memory 22 is read and combined with the partial data in page buffer 26, and then the combined data is written to target block 24 in flash memory 22. When the host issues a stop command to end a data transfer, a partially-full page buffer 26 can be combined with old data fragments in AFB 20 and stored in AFB 20.

Combining host writes with old data fragments in AFB 20 may eliminate writing and eventually erasing an extra block in flash memory 22, since 2 blocks of data are combined. Thus wear is improved.

Since each channel has its own page buffer 26 and its own AFB 20 in flash memory 22, data accumulation, aggregating, and combining may be performed in parallel in each channel. Multi-channel controller processor 30 can interleave or otherwise assign host accesses among the channels, making it more likely that accumulation can occur before interruption. Thus multi-channel aggregating of flash blocks can be more successful than a simpler wear-leveling scheme.

Figure 1B:
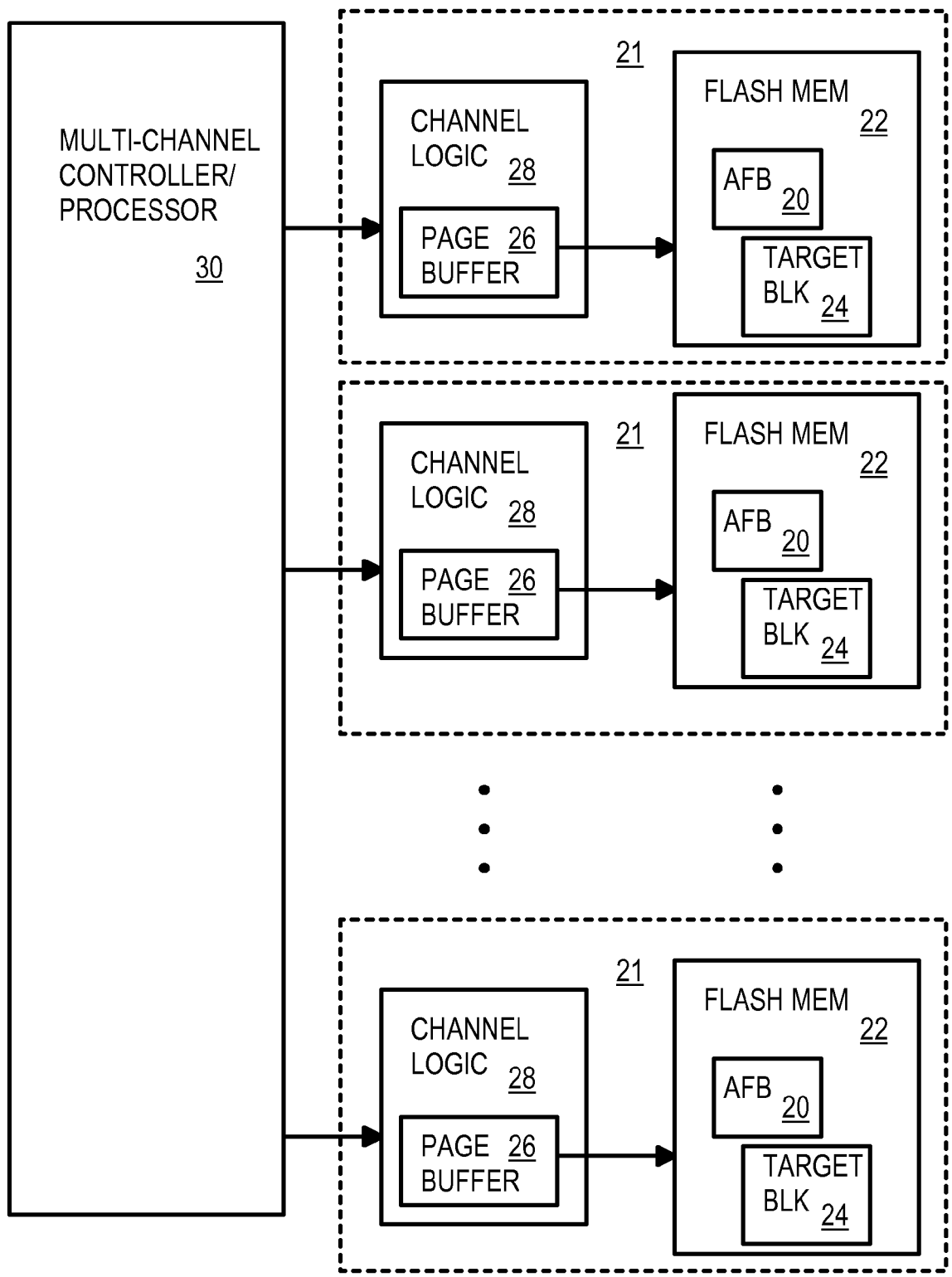
FIG. 1B shows a large flash system with multiple Non-Volatile Memory Devices (NVMD's) for each channel.

FIG. 1B shows a large flash system with multiple Non-Volatile Memory Devices (NVMD's) for each channel. Channel logic 28 and flash memory 22 may be integrated together into NVMD 21. Channel logic 28 can still accumulate writes in page buffer 26 and use AFB 20 for combining data to reduce block erases and wear in each channel.

Figure 2:
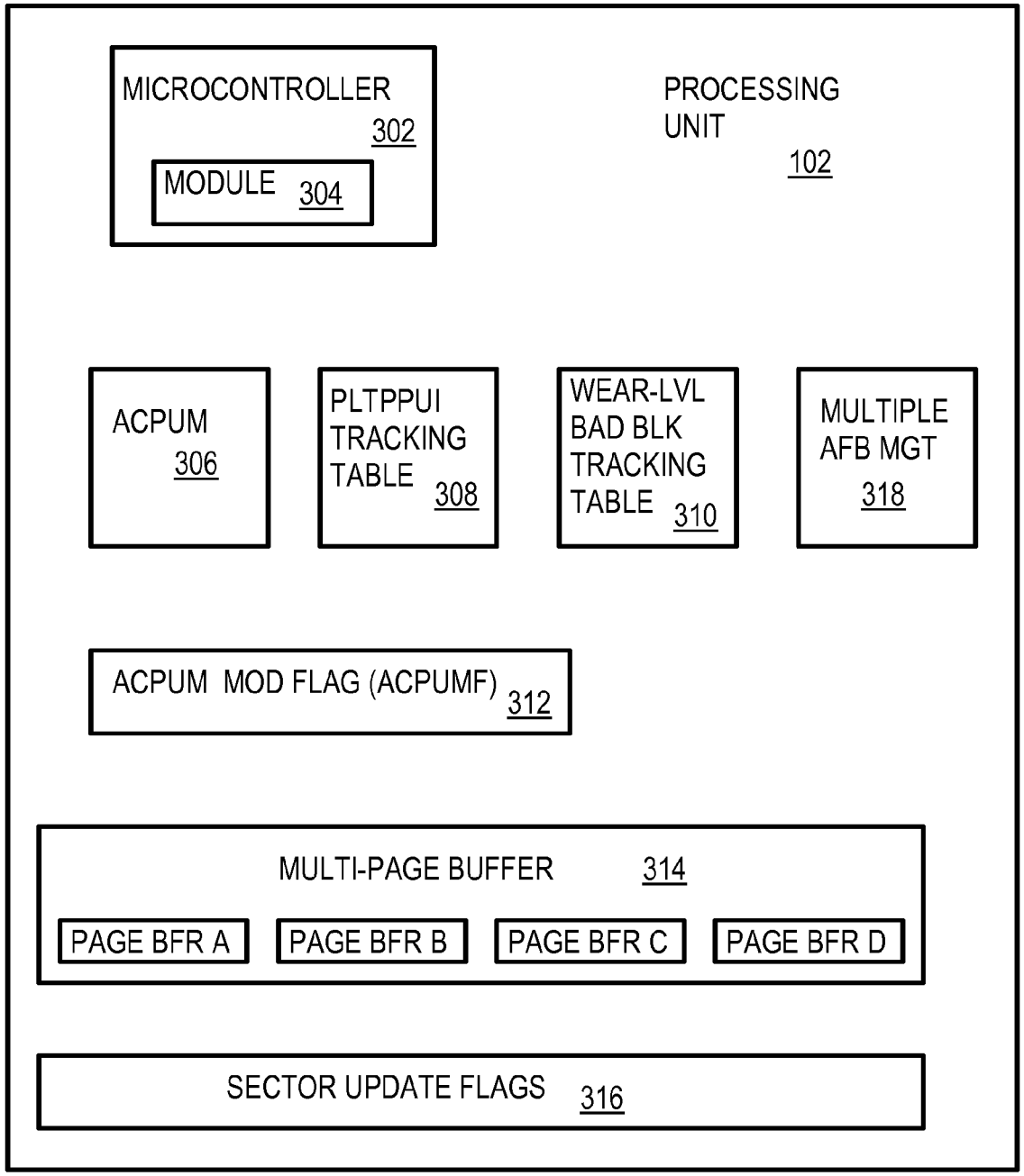
FIG. 2 is a block diagram showing components of a multi-channel controller processor.

FIG. 2 is a block diagram showing components of a multi-channel controller processor. Multi-channel controller processor 30 of FIGS. 1A-B may have other components, but includes the components or functions shown here in processing unit 102.

Microcontroller 302 has a central processing unit (CPU) and reads instructions from memory or firmware in module 304.

Other components in processing unit 102 include address correlation and page usage memory (ACPUM) 306, partial logical-to-physical address and page usage information (PLTPPUI) tracking table 308, wear leveling and bad block (WL/BB) tracking table 310, ACPUM modification flag (ACPUMF) 312, multi-page buffer 314, multi-AFB manager 318, and a set of sector update flags 316.

Advanced I/O interface logic (not shown) may be added to facilitate data, control signal and power communication with a host (e.g., a computer system, an electronic device, etc.) via a host bus in accordance with Advanced Memory Host Control Interface (AMHCI). AMHCI enables communication of data, control signals and power management between flash memory and the host. AMHCI is a protocol that works in conjunction with other current and future industry standards including for example, current and future versions of Universal-Serial Bus (USB), Secure Digital, Serial (SD), Micro SD, Multi-Media Card (MMC), Compact Flash (CF), Memory Stick (MS), PCI-Express, a Integrated Drive Electronics (IDE), Serial Advanced Technology Attachment (SATA), Parallel SATA, Radio Frequency Identification (RFID), fiber channel and optical connections, or other equivalent technological standards.

Microcontroller 302 with flash memory controlling program module 304 (e.g., firmware (FW)) installed thereon is configured to control the data transfer between the host computer system and the NVMD. ACPUM 306 is configured to provide an address correlation table, which contains a plurality of entries, each representing a correlation between a partial logical block address (i.e., entries) to the corresponding physical block number. In addition, a set of page usage flags associated with the physical block is also included in each entry. ACPUM 306 represents only one of the N sets of PLTPPUI, which is stored in the reserved area of the flash memory.

In order to keep tracking the physical location (i.e., physical block number) of each of the N sets of PLTPPUI, the physical location is stored in PLTPPUI tracking table 308. Each item is PLTPPUI tracking table 308 corresponds a first special logical address to one of the N sets of PLTPPUI. The wear leveling counters and bad block indicator for each physical block are stored in a number of physical blocks referred by corresponding second special logical addresses (e.g., '0xFFFFFF00').

WL/BB tracking table 310 is configured to store physical block numbers that are assigned or allocated for storing these physical block wear leveling counters and bad blocks. ACPUM modification flag (ACPUMF) 312 is configured to hold an indicator bit that tracks whether ACPUM 306 has been modified or not. Multi-page buffer 314 is configured to hold data fragments in several parallel data transfer requests to the different channels of flash. Multi-page buffer 314 has a size equaling to the page size of flash memory 22 multiplied by the number of flash channels. Multi-page buffer 314 has several page buffers that are located in multi-channel controller processor 30.

Sector update flags 316 are configured to hold valid data flag for each of the corresponding sectors written into data area of multi-page buffer 314. For example, four sector update flags are required for a page buffer comprising four sectors. Multi-page buffer 314 also includes a spare area for holding other vital information such as error correction code (ECC) for ensuring data integrity of the flash memory.

Multi-AFB manager 318 manages AFB 20 in each channel of flash memory 22 (FIG. 1A). Each channel has its own AFB 20, and addresses of old data fragments in each AFB 20 are stored and compared to new host addresses by multi-AFB manager 318.

Figure 3:
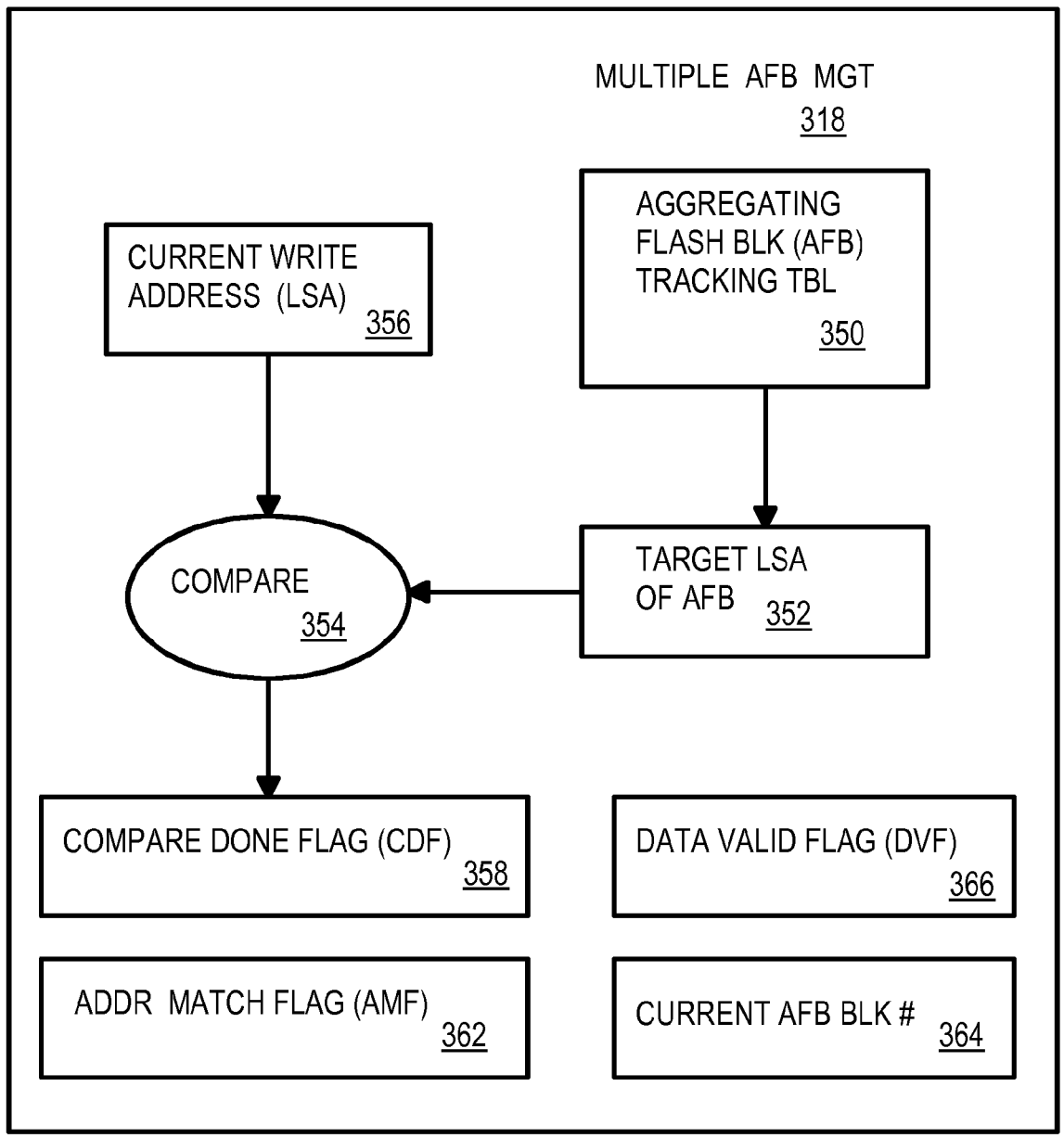
FIG. 3 shows a multi-AFB manager in more detail.

FIG. 3 shows a multi-AFB manager in more detail. Multi-AFB manager 318 manages multiple blocks of AFB 20 (FIG. 1A) for the multiple channels of flash. Current write address 356 is a logical-sector address (LSA) from the host for a current write access from the host. Comparator 354 compares this host LSA to target LSA of AFB 352, which is the target address LSA for the old data fragments that is aggregated in AFB 20. Target LSA of AFB 352 is read from AFB tracking table 350, which stores the target address of all AFB's in all channels of flash.

When the host and AFB LSA addresses match, Address-Matched Flag (AMF) 362 is set to one. The channel or other ID number of the matched AFB block (read from AFB tracking table 350) is loaded into register 364 as the Current AFB Block Number (CAFBBN). Once the address comparison process is done, the Comparison-Done Flag (CDF) 358 is set to one. In addition, if any one of the AFB blocks stores valid data, Data-Valid Flag (DVF) 366 is also set to one; otherwise, it is set to zero.

FIG. 4 shows the AFB tracking table in more detail. AFB tracking table 350 has an entry (row) for each AFB 20 (FIG. 1A). Each channel of flash has its own AFB 20 in this example. The physical block number identifies the location of the AFB in flash memory. Each AFB has a different physical block number. The data valid flag (DVF) is set when there is valid data in the AFB, but cleared when no valid data is in the AFB.

Since pages are written in sequence order, and only 1 page of valid aggregated data is stored in each AFB, the last page number field indicates where the last valid page of data is within the many pages of the AFB. Pages of stale and invalid data may precede the indicted last page, or there may be several valid pages, while fresh unwritten pages follow the indicate last page number within the AFB.

The target block's logical-sector address (LSA) for the old data fragments in the AFB is also stored in the entry for each AFB in AFB tracking table 350. This LSA is compared with the host LSA by comparator 354 (FIG. 3) to determine when to flush the AFB and when to combine the old data fragments in the AFB with the new host data.

Figure 5:
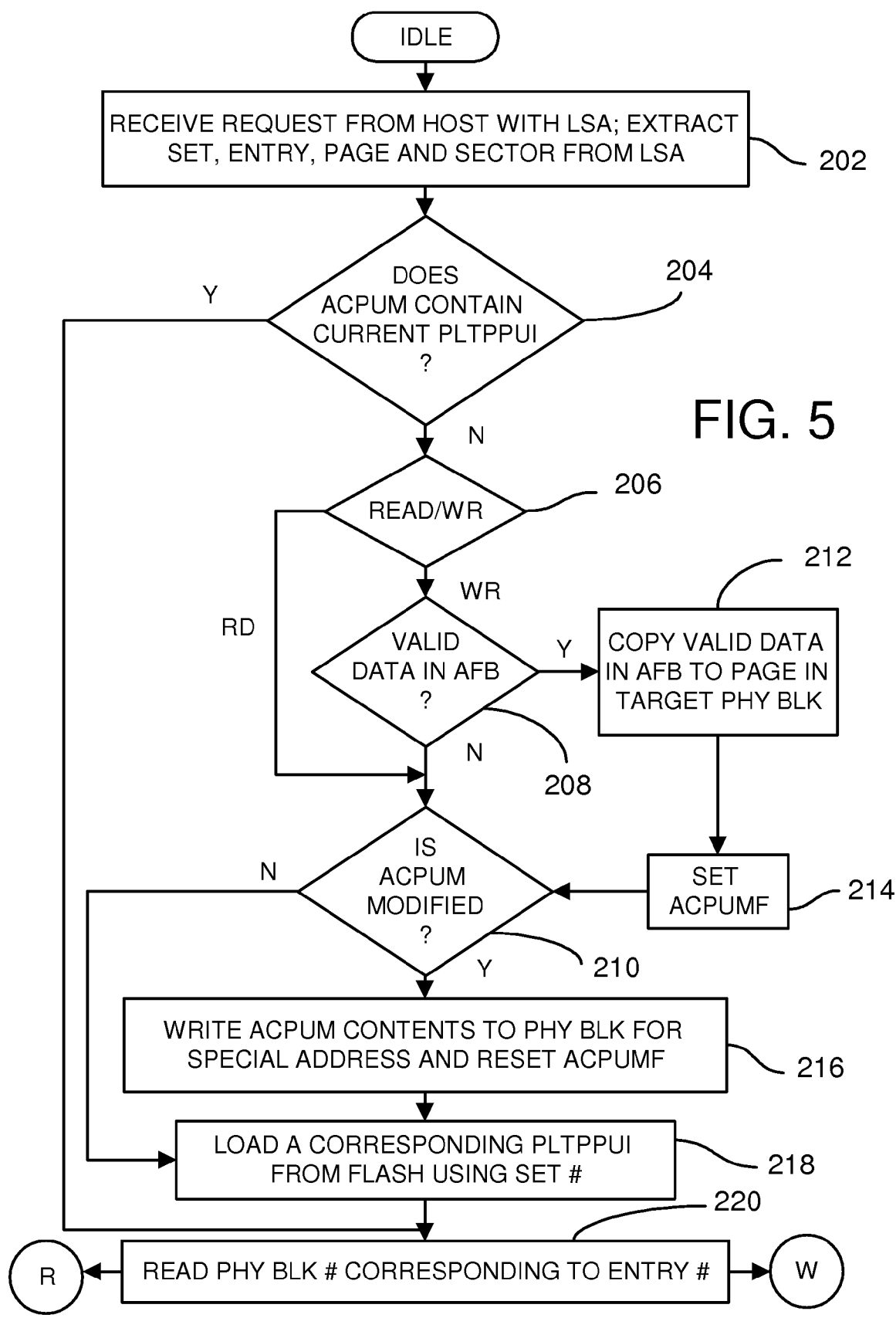
FIG. 5 is a flowchart of a host transfer processed by the multi-channel controller processor.

FIG. 5 is a flowchart of a host transfer processed by the multi-channel controller processor. This process can be performed by microcontroller 302 (FIG. 2) executing instructions in program module 304.

The process starts in an 'IDLE' state until microcontroller 302 receives a data transfer request from a host, step 202. Also received in the data transfer request is a logical sector address (LSA), which indicates the location the host wishes to either read or write a sector of data (i.e., 512-byte sector). Based on the parameters defined and the physical characteristics of the MLC-based flash memory, the received LSA is processed to extract the set, entry, page and sector numbers included therein.

After the received LSA has been processed, the process moves to decision 204. It is determined whether ACPUM 306 (FIG. 2) has been loaded with a set of PLTPPUI that covers the received LSA. If 'yes', the process reads out the physical block number (PBK#) corresponding to the entry number of the received LSA at step 220 before determining whether the data transfer request is read or write (i.e., program).

If decision 204 is 'no', the process moves to decision 206. The process checks whether the contents of the page buffer need to be stored. In one implementation, the process checks the sector update flags that correspond to sectors in the AFB. If any one of the sector flags has been set to 'valid', then the contents of the AFB are stored to the corresponding page of the corresponding target physical block of the MLC flash memory at step 212. After the contents of the AFB have been stored, the process sets ACPUM modification flag (ACPUMF) 312 to a 'modified' status at step 214. In other words, ACPUM 306 has been modified and needs to be stored in the flash memory in the future. Then the process moves to yet another decision 210.

Otherwise if 'no' occurs at decision 206, the process moves to decision 210 directly. It is then determined if ACPUM 306 has been modified. If 'yes', the process moves to step 216, in which the process writes the contents of ACPUM 306 to one of a plurality of first special logical addresses (e.g., '0xFFFF0000' for PLTPPUI0, or '0xFFFF0001' for PLTPPUI1, etc.) for storing a corresponding set of PLTPPUI in the reserved area of the flash memory. ACPUM modification flag 312 is reset at the end of step 216.

Then, at step 218, the process loads a corresponding set of PLTPPUI to ACPUM 306 from the flash memory based on the set number extracted from the host's LSA in step 202. Once ACPUM 306 has been loaded, the process reads the physical block number that corresponds to the entry number at step 220 and continuing with the read or write access.

When the data transfer request is a data read request, (not shown) the process continues with a sub-process that reads data from the corresponding page of the physical block in the flash memory to the page buffer. The corresponding page number is derived from the received LSA, and the physical block number is obtained through ACPUM 306 for the entry numbers. Finally, the process sends the requested data sector from the page buffer to the host before going back the 'IDLE' status waiting for another data transfer request.

Figure 6A:
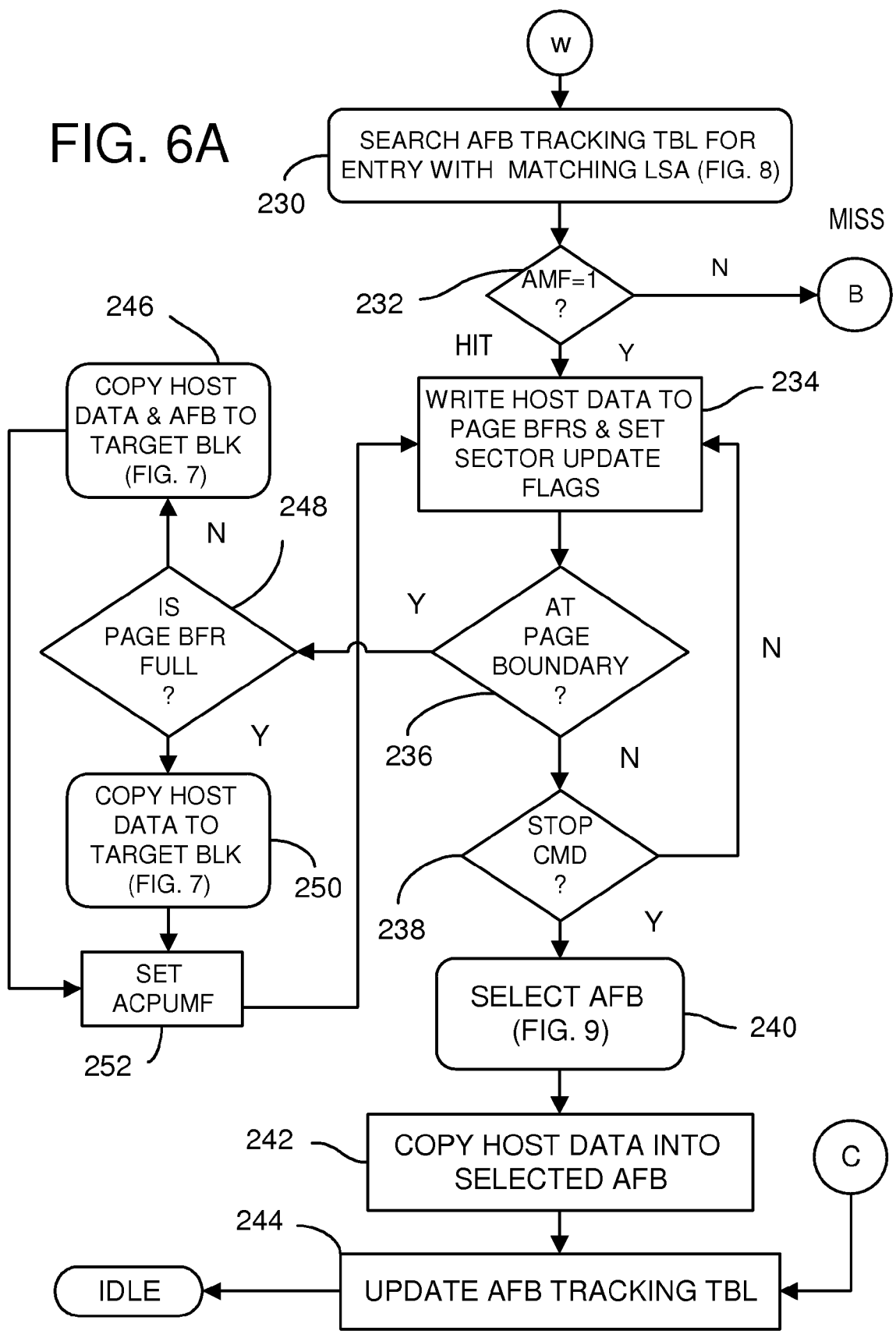
FIGS. 6A-B are a flowchart of a sub-process for writing host data to an Aggregating Flash Block (AFB), page buffer, or target flash block.
Figure 6B:
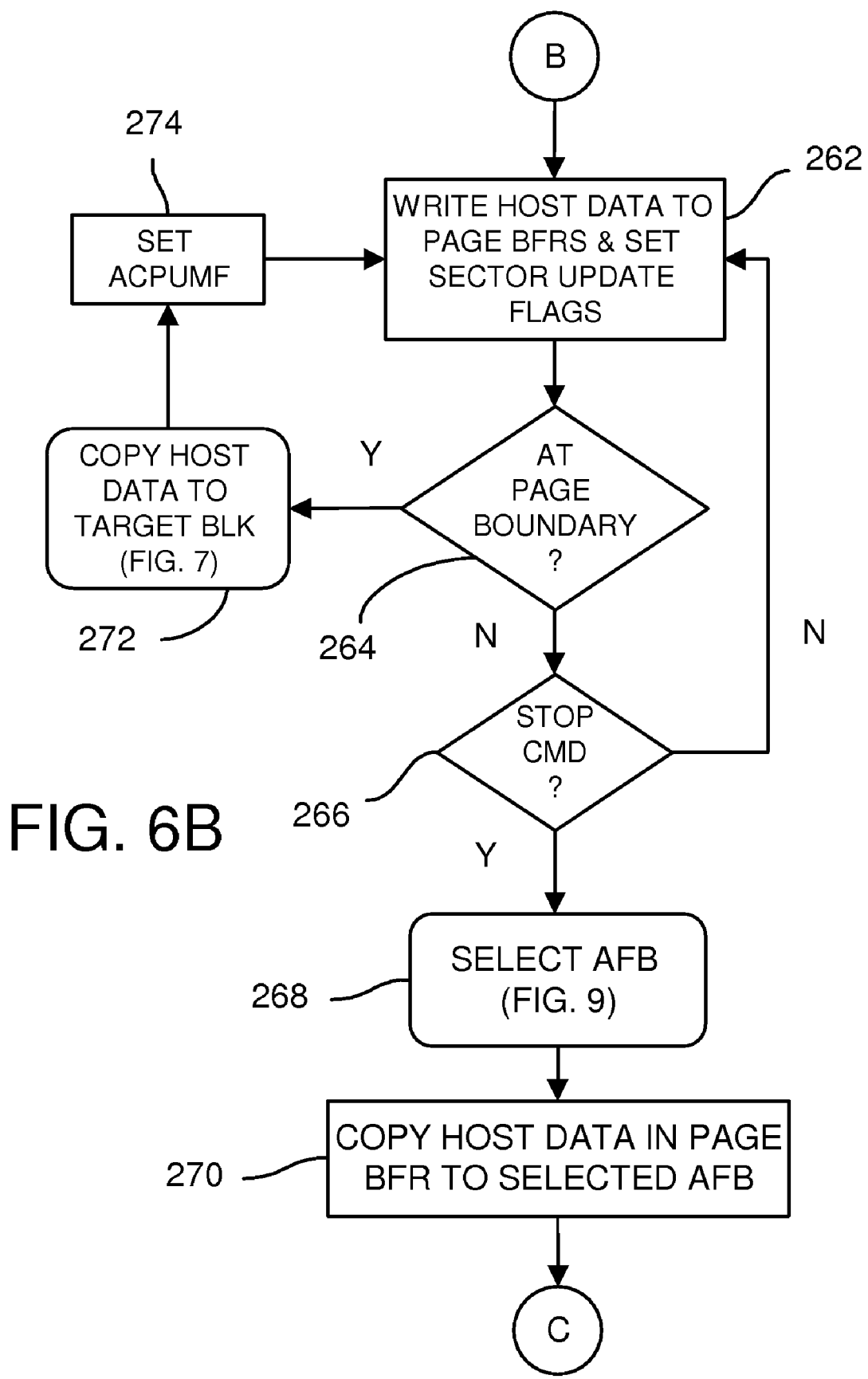

If the data transfer request is a data write or program request, the process continues with a sub-process shown in FIG. 6A. FIGS. 6A-B are a flowchart of a sub-process for writing host data to an Aggregating Flash Block (AFB), page buffer, or target flash block.

The LSA from the host request is compared to stored LSA's in AFB tracking table 350, step 230, to look for a matching AFB entry. FIG. 8 shows this procedure in more detail. The address match flag (AMF) is set when a match is found in AFB tracking table 350. When no AFB entry in AFB tracking table 350 matches the host LSA, a miss occurs, step 232, and the process continued in FIG. 6B.

When a hit occurs, step 232, AFB tracking table 350 has a matching entry. The host address matches a logical address of old data fragments in one of AFB 20 (FIG. 1A). The multi-channel controller processor directs the host request to the channel with this matching AFB so that partial writes may be aggregated, reducing wear.

The host data is stored in page buffer 26 of the selected channel, and the corresponding sector update flags are set for the valid data, step 234. Data from several host requests may be accumulated in page buffer 26 as long as the page boundary of page buffer 26 is not reached, step 236, and a stop command is not received from the host, step 238.

When enough host data is received, the page boundary is crossed, step 236, and page buffer 26 must be flushed. When page buffer 26 is full, step 248, the full page of host data in page buffer 26 is copied to the target flash block, step 250. The target flash block is the physical block number assigned by multi-channel controller processor 30, and is the permanent location of the data, unless some data relocation scheme later moves the flash data.

When page buffer 26 is not full, step 248, some of the old data fragments in AFB 20 may be combined with the host data in partially-full page buffer 26, and the full (or more nearly full) page of host data in page buffer 26 is copied to the target flash block, step 246. More details of the routine to copy data from page buffer 26 to the target physical block is shown in FIG. 7.

ACPUM modification flag (ACPUMF) 312 is set, step 252, to indicate that ACPUM 306 has been modified and a new copy of ACPUM 306 needs to be stored to flash for system integrity in case of power failure. Additional host data may be accumulated into page buffer 26, step 234, overwriting the data in page buffer 26 has been copied back to flash memory (step 246 or 250). Many pages of data may be accumulated in page buffer 26, then combined with old data fragments from AFB 20 and written to the target physical block in flash memory 22.

Figure 9:
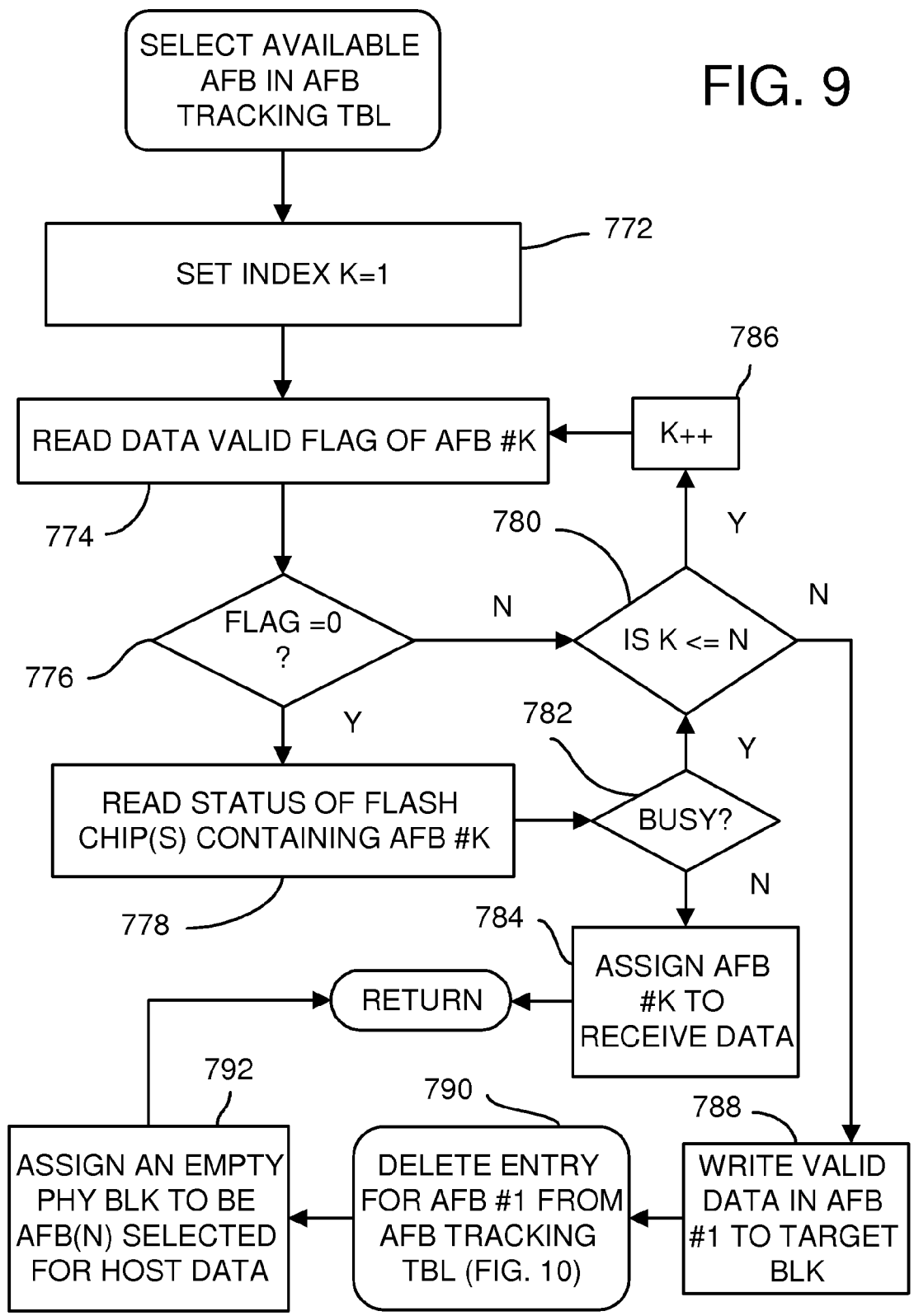
FIG. 9 is a flowchart of selecting an available Aggregating Flash Block (AFB) for receiving host data remaining in the page buffer when the host sends a STOP command.

Eventually the host may issue a STOP command, step 238. One of the Aggregating Flash Block (AFB's) in AFB tracking table 350 is selected to receive the host data remaining in the page buffer when the host sends a STOP command, step 240. Details of selecting an AFB are shown in FIG. 9.

In step 242, the remaining host data in page buffer 26 is copied to the AFB selected in step 240. AFB tracking table 350 is updated to reflect the new valid data just copied into it, step 244, and the write process becomes idle or ends.

When the host LSA address does not match an AFB in AFB tracking table 350 (steps 230, 232), the procedure moves to FIG. 6B. The host data is stored in page buffer 26 of the selected channel, and the corresponding sector update flags are set for the valid data, step 262. Data from several host requests may be accumulated in page buffer 26 as long as the page boundary of page buffer 26 is not reached, step 264, and a stop command is not received from the host, step 266.

When enough host data is received, the page boundary is crossed, step 264, and page buffer 26 must be flushed. The full or partial page of host data in page buffer 26 is copied to the target flash block, step 272 (See FIG. 7 for details). No data combining occurs since there was no matching AFB in AFB tracking table 350 (Step 232).

ACPUM modification flag (ACPUMF) 312 is set, step 274, to indicate that ACPUM 306 has been modified and a new copy of ACPUM 306 needs to be stored to flash for system integrity in case of power failure. Additional host data may be accumulated into page buffer 26, step 262, overwriting the data in page buffer 26 has been copied back to flash memory (step 274). Many pages of data may be accumulated in page buffer 26, then combined with old data fragments from AFB 20 and written to the target physical block in flash memory 22.

Eventually the host may issue a STOP command, step 266. One of the Aggregating Flash Blocks (AFB's) in AFB tracking table 350 is selected to receive the host data remaining in the page buffer when the host sends a STOP command, step 268. Details of selecting an AFB are shown in FIG. 9.

In step 270, the remaining host data in page buffer 26 is copied to the AFB selected in step 268. Back in FIG. 6A, AFB tracking table 350 is updated to reflect the new valid data just copied into it, step 244, and the write process becomes idle or ends.

Figure 7A:
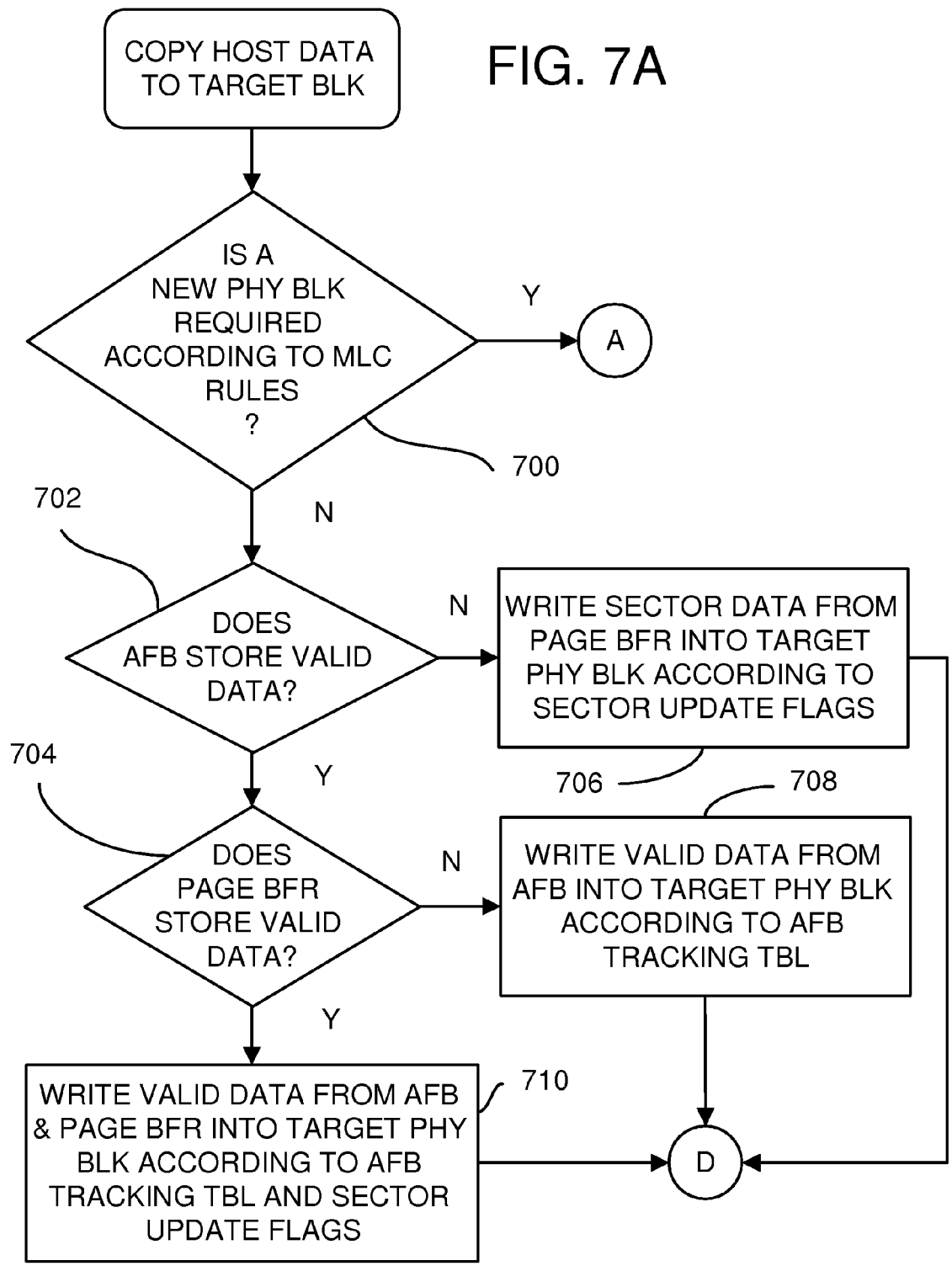
Figure 7C:
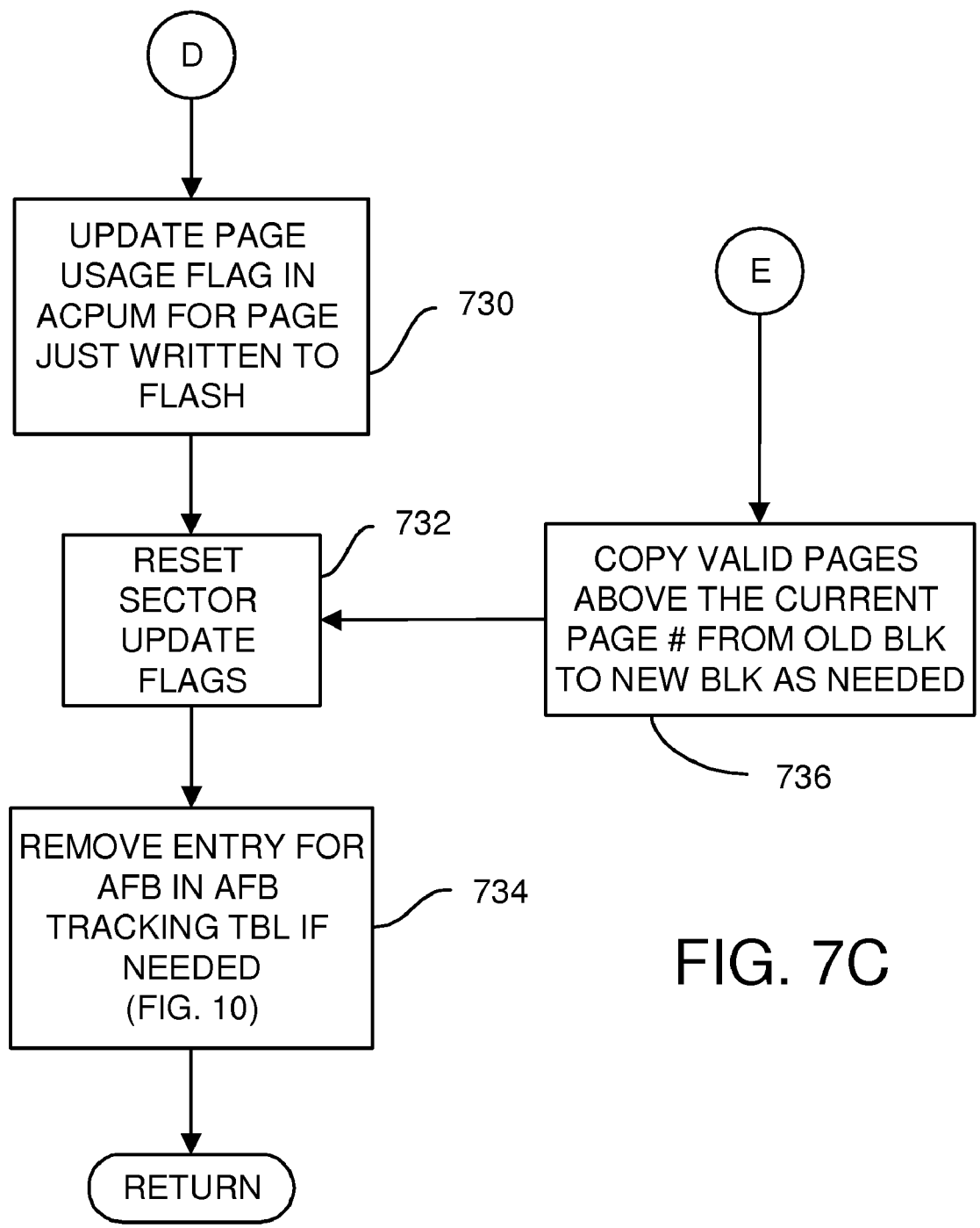

FIGS. 7A-C show a process to flush host data from the page buffer to the target physical block, and optionally combine old data fragments from the AFB to reduce wear. When page buffer 26 needs to be copied to the target block, a new physical block is needed, step 700, such as when the last page in the target block has already been written, since a restrictive-write MLC flash can only write pages in page sequence, not out-of-sequence. The process switched to FIG. 7B when a new physical block is needed.

When there is no valid data in the AFB, step 702, then the valid data in page buffer 26 is copied to a page in the physical block, step 706. The sector update flags indicate which sectors in page buffer 26 are valid. Page buffer 26 can then be re-filled with more host data, and the process moves to FIG. 7C.

When the AFB contains valid data, step 702, but page buffer 26 does not have valid data, step 704, then the valid data in AFB 20 is copied to its target physical block, step 708, using AFB tracking table 350 to find valid pages in AFB 20. Page buffer 26 can then be re-filled with more host data, and the process moves to FIG. 7C.

When the AFB contains valid data, step 702, and page buffer 26 also has valid data, step 704, then the valid data in AFB 20 is combined with the valid data in page buffer 26, and the combined data is copied to its target physical block, step 710, using AFB tracking table 350 to find valid pages in AFB 20 and the sector update flags to find valid data in page buffer 26. Page buffer 26 can then be re-filled with more host data, and the process moves to FIG. 7C.

In FIG. 6C, after the data in page buffer 26 and/or AFB 20 has been copied to the target physical block, the page usage flag in ACPUM 306 is update to indicate that the target physical block was just written to, step 730.

The sector update flags are cleared, step 732, so that page buffer 26 is indicted as being empty and able to receive more host data. The entry for the current AFM in AFB tracking table 350 may be removed, step 734, following the procedure of FIG. 10, before the routine returns to the calling location in FIG. 6.

When a new physical block is needed, step 700, the flow continues in FIG. 7B. An empty, erased block is allocated using various wear-leveling rules, step 720. ACPUM 306 is updated for the new physical block number of the newly allocated block, step 722. The page usage flags are not changed.

When there is no valid data in the AFB, step 712, then the valid data in page buffer 26 is copied to a page in the physical block, step 716. The sector update flags indicate which sectors in page buffer 26 are valid. Page buffer 26 can then be re-filled with more host data, and the process moves to FIG. 7C.

When the AFB contains valid data, step 712, but page buffer 26 does not have valid data, step 714, then the valid data in AFB 20 is copied to its target physical block, step 718, using AFB tracking table 350 to find valid pages in AFB 20. Page buffer 26 can then be re-filled with more host data, and the process moves to FIG. 7C.

When the AFB contains valid data, step 712, and page buffer 26 also has valid data, step 714, then the valid data in AFB 20 is combined with the valid data in page buffer 26, and the combined data is copied to its target physical block, step 726, using AFB tracking table 350 to find valid pages in AFB 20 and the sector update flags to find valid data in page buffer 26. Page buffer 26 can then be re-filled with more host data, and the process moves to FIG. 7C.

In FIG. 7C, valid pages above the current page number are copied from the old AFB to the new AFB, step 736. Then the sector flags can be updated, step 732, and the entry for the current AFM in AFB tracking table 350 may be removed, step 734, following the procedure of FIG. 10, before the routine returns to the calling location in FIG. 6.

FIG. 8 is a flowchart of a search procedure that searches for a matching LSA in the AFB tracking table. This sub-routine is called by step 230 of FIG. 6A. AFB tracking table 350 is searched to find a matching entry that has a stored LSA that matches the host's LSA.

Initially, the compare-done flag (CDF), address match flag (AMF), data valid flag (DVF), and the current AFB block number are cleared in registers 358, 366, 362, 364 of FIG. 3. The iteration index K is set to 1, step 752, to point to the first entry in AFB tracking table 350.

The data valid flag of the current entry in AFB tracking table 350 is read, step 754. When the data valid flag is zero, the current entry does not contain valid information, and the sub-routine can advance to the next entry by incrementing K, step 770, after checking for the end of AFB tracking table 350, step 768. AFB tracking table 350 has N entries, so index K is compared to N in step 768.

When the data valid flag of the current entry in AFB tracking table 350 is true (1), step 756, then a valid entry has been located. The data valid flag (DVF) is set, step 758. The target LSA is read from the current entry of AFB tracking table 350 and compared to the host's LSA, step 762.

When the LSA's do not match, step 760, then a matching entry was not found. The sub-routine can advance to the next entry by incrementing K, step 770, after checking for the end of AFB tracking table 350, step 768.

When the LSA's match, step 760, a matching entry has been located in AFB tracking table 350. The address match flag (AMF) is set, and the current AFB block number is loaded with the physical block number stored in the matching entry of AFB tracking table 350, step 755. The compare done flag (CDF) is set to indicate that comparison is completed, step 766, and the sub-routine ends and returns control to the main routine of FIG. 6A.

When no matching entry is found after checking all entries in AFB tracking table 350, step 768, then the address match flag (AMF) remains cleared. The compare done flag (CDF) is set to indicate that comparison is completed, step 766, and the sub-routine ends and returns control to the main routine of FIG. 6A.

FIG. 9 is a flowchart of selecting an available Aggregating Flash Block (AFB) for receiving host data remaining in the page buffer when the host sends a STOP command. This sub-routine is called by step 240 in FIG. 6A or step 268 of FIG. 6B. The sub-routine searches for an empty entry in AFB tracking table 350. If no empty entry is found, the first AFB entry is selected and replaced.

The iteration index K is set to 1, step 772, to initialize. The data valid flag of the current entry in AFB tracking table 350 is read, step 774. When the data valid flag is one, the current entry contains valid information, and the sub-routine can advance to the next entry by incrementing K, step 786, after checking for the end of AFB tracking table 350, step 780. AFB tracking table 350 has N entries, so index K is compared to N in step 780.

When the data valid flag of the current entry in AFB tracking table 350 is false (0), step 776, then an empty entry has been located. This is an ideal entry to use, since an old AFB does not have to be evicted and copied to its target block. However, the flash chip that store this entry's AFB may be busy and unavailable, so the status of the flash chips are read, step 778, and when busy, step 782, the search continues for another available entry, steps 780, 786.

When the flash chips are not busy, an available AFB has been found, step 782. The AFB for this index K is assigned to receive the data, step 784. The sub-routine ends and returns control to the main routine of FIG. 6.

When all values of index K have been tested, step 780, and no empty entry with a non-busy flash chip has been found, then one of the AFB's must be evicted to make room for the new data. The first entry (K=1) is deleted, the other entries are moved up one, and the new data is assigned to the last entry in AFB tracking table 350. Thus a first-in-first-out queue is used to reduce thrashing.

Figure 10:
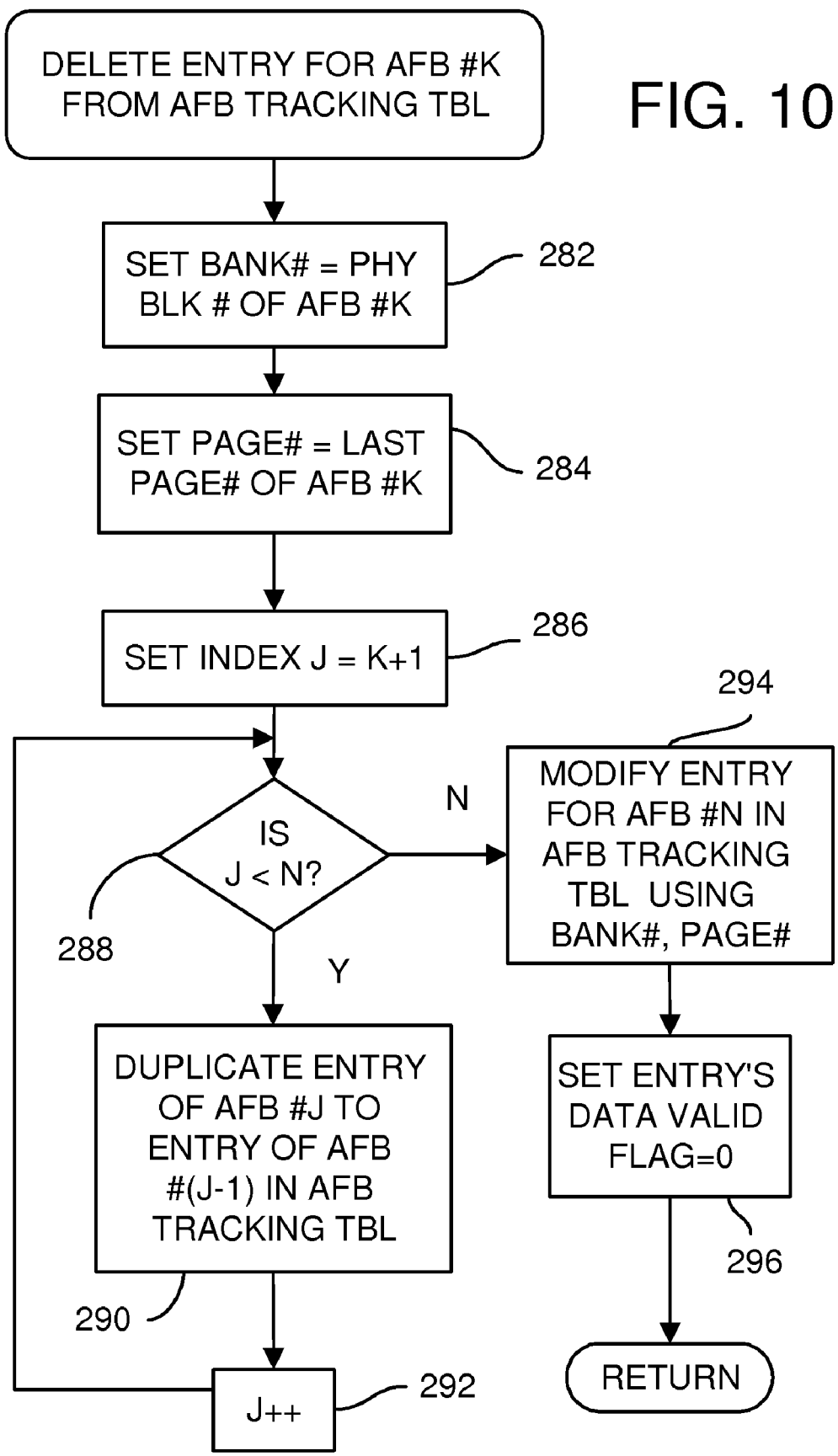
FIG. 10 is a procedure for removing the entry for the current AFB in the AFB tracking table and moving up other entries as a queue.

The valid data in the first entry's AFB is copied to its target physical block, step 788, and this entry can be deleted, step 790, and the other entries moved up by one, as described for FIG. 10. An empty physical block is assigned to be the AFB for the last entry N in AFB tracking table 350, step 792. The last entry is empty since all entries in AFB tracking table 350 have been moved up by one in the sub-routine of FIG. 10. The sub-routine ends and returns control to the main routine of FIG. 6.

FIG. 10 is a procedure for removing the entry for the current AFB in the AFB tracking table and moving up other entries as a queue. The entry with index K is to be removed from AFB tracking table 350, such as when step 790 or FIG. 9 calls this sub-routine with K=1. Step 734 of FIG. 7C also calls this sub-routine.

The bank number is obtained from the physical block number stored in entry K of AFB tracking table 350, step 282. The bank number may be a modulo remainder of the block number, for example. The page number is set to be the last page number that is stored in entry K of AFB tracking table 350, step 284.

A second index J is set to be K+1, step 286. J steps from entry K to the last entry N in AFB tracking table 350. For an entry J less than N, step 288, entry J is duplicated to entry J−1 in AFB tracking table 350, step 290. J is then incremented, step 292, and the loop repeats. This loop moves the entries up one row in AFB tracking table 350.

Once the last entry N is reached, step 288, this entry N has already been duplicated to entry N−1 in the prior loop, step 290. Last entry N is modified in step 294 by writing the bank number and page number that were obtained from entry K in steps 282, 284.

The data valid flag for this last entry N is cleared to zero, since data has not yet been written to the newly assigned AFB, step 296. The sub-routine ends and returns control to the calling sub-routine of FIG. 7C or 9.

EXAMPLES OF OPERATION

FIGS. 11-15

Four examples are described below to illustrate applications of multiple channels and multiple AFB blocks. Examples A and B shows how to use the two concepts to improve the write performance. Examples C and D investigate how to efficiently mange multiple AFB blocks. In all of the examples, it is assumed that the controller has four channels with four page buffers. Each page buffer can store four data sectors. Moreover, the AFB tracking table stores six entries with a total of 6 AFB blocks.

Example A

Assume that six AFB blocks do not store valid data. Moreover, the host transmits data in a sequence of three sectors, two sectors, and one sector, separately, to the flash system using three write requests with different target addresses.

Figure 11A:
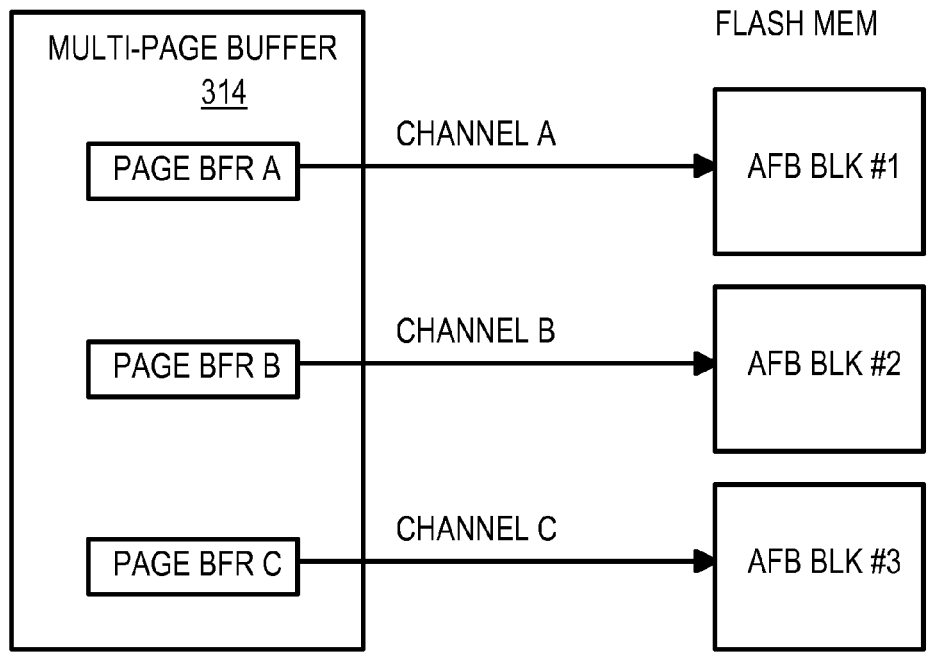
FIG. 11A shows channel A being used to send host data in page buffer A of multi-page buffer 314 to AFB block #1, the first entry in AFB tracking table 350.

FIG. 11A shows channel A being used to send host data in page buffer A of multi-page buffer 314 to AFB block #1, the first entry in AFB tracking table 350. Channel B is being used to copy host data in page buffer B to AFB block #2, and channel C is being used to copy host data in page buffer C to AFB block #3.

Figure 11B:
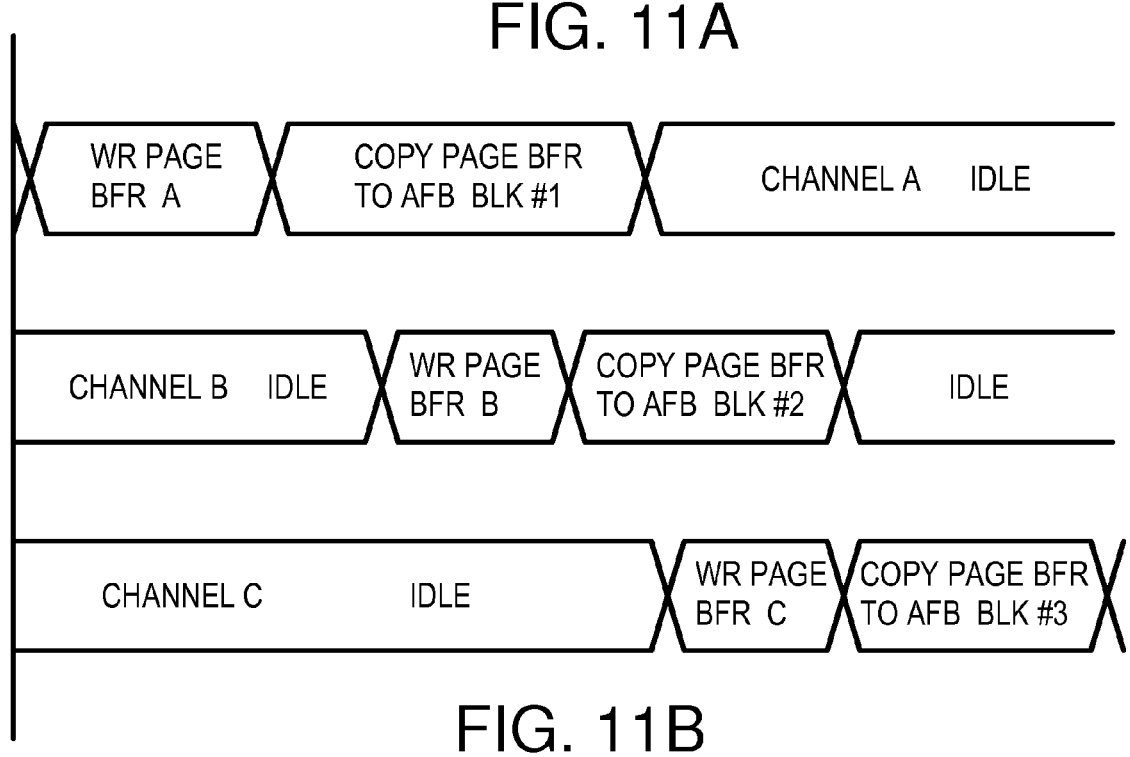
FIG. 11B shows the timing where host data is accumulated into page buffer A then copied to AFB #1.

FIG. 11B shows the timing where host data is accumulated into page buffer A then copied to AFB #1. Host data from the second transaction is accumulated to page buffer B and then copied over channel B to AFB #2, and host data from the third transaction is accumulated to page buffer C and then copied over channel C to AFB #3.

FIGS. 12A-D show the AFB tracking table for the example of FIGS. 11A-B. AFB tracking table 350 has 6 entries that are all initially invalid in FIG. 12A.

Step 1: Receive a write request. Multiple AFB Block Management sets CDF=1 and AMF=0. Receive three data sectors from the host and write these sectors sequentially in Buffer A through Channel A.

Step 2: After receiving a STOP command, firmware selects AFB Block 1 from the AFB. See FIG. 12A. Subsequently, it duplicates the valid sectors in Buffer A to AFB Block 1.

Step 3: Receive a write request. The Multiple AFB Block Management sets CDF=1 and AMF=0. Receive two data sectors from host and write the sectors sequentially in Buffer B through Channel B.

Step 4: After receiving a STOP command, firmware selects AFB Block 2 from the AFB. See FIG. 12B. Subsequently, it duplicates the valid sectors in Buffer B to AFB Block 2.

Step 5: Receive a write request. The Multiple AFB Block Management sets CDF=1 and AMF=0. Receive one data sector from host, and write the sectors sequentially in Buffer C through Channel C.

Step 6: After receiving a STOP command, firmware selects AFB Block 3 from the AFB. See FIG. 12C. Subsequently, it duplicates the valid sectors in Buffer C to AFB Block 3.

Step 7: Update the AFB tracking table, as shown in the table of FIG. 12D.

Observe from the timing diagram (FIG. 11B) that there are three AFB blocks that are used simultaneously most of time without waiting for the end of previous steps. Thus the performance of random writes can be efficiently improved.

Example B

Assume that six AFB blocks have stored valid data, as shown in FIG. 13A. The host sends a write request to the device with a target address (LSA)=0001_1110.

Step 1: Receive a write request with a target address=0001_1110. (Set number=0, entry number=1, page number=3, and sector number=2.) Subsequently, the Multiple AFB Block Management starts the flow chart of FIG. 8 to search for a matching AFB entry in AFB tracking table 350.

Finally, it indicates that AFB Block 3 is matched since the set number, entry number, and page number are identical to the current write address (LSA). Thus the Multiple AFB Block Management sets CDF=1, AMF=1, CAFB#=3.

Step 2: Receive two data sectors from the host and write the sectors sequentially in Buffer A through Channel A.

Step 3: Assume that a page boundary is hit. After receiving a STOP command, firmware starts to duplicate the valid data in AFB Block 3 and the rest of the data in Buffer A to the target page of the physical block address.

In the example, it should be noted that there are six candidate blocks to check which one of the target LSAs matches with the current writing address. As compared to using only one AFB block, the application of multiple AFB blocks increases the probability of programming random write data into a full page; thus it may reduce unnecessary erase and copy-back operations in the flash memory blocks.

Example C

Figure 14A:
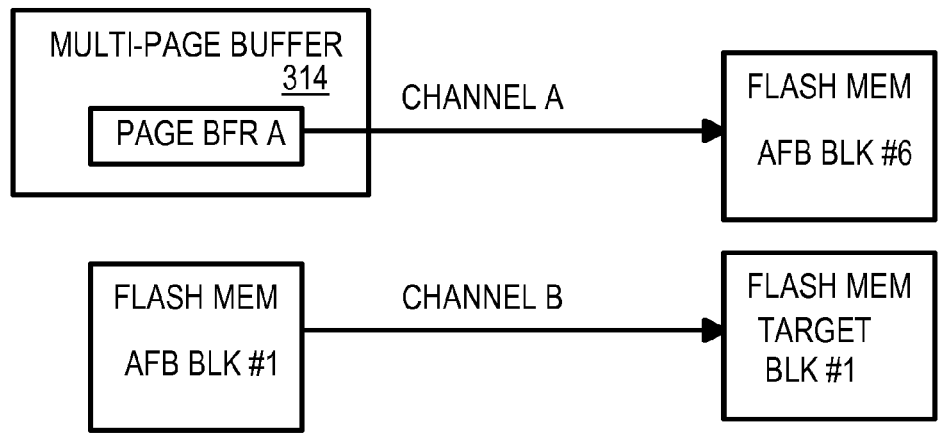
FIG. 14A shows channel A being used to send host data in page buffer A of multi-page buffer 314 to AFB block #6, the last entry in the AFB tracking table.
Figure 14B:
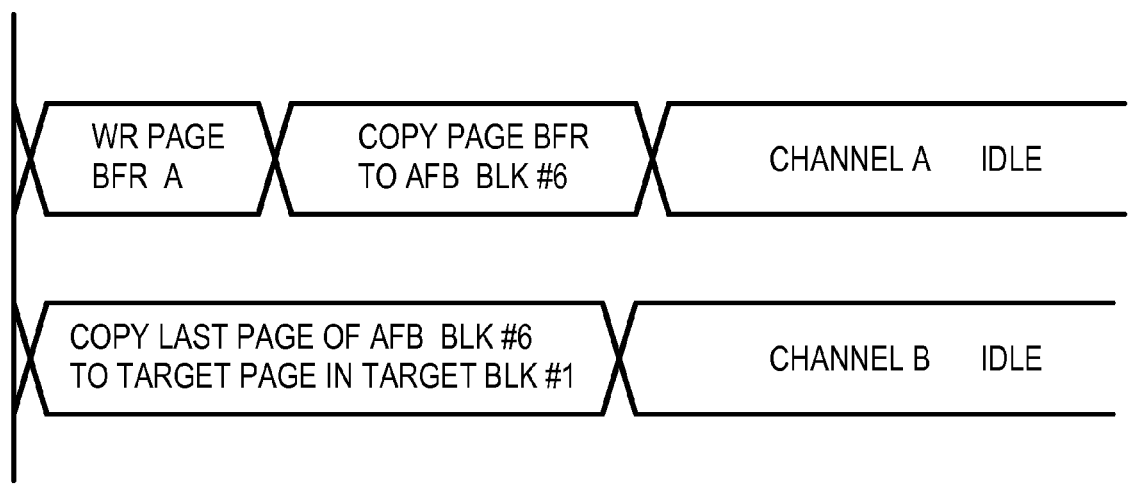
FIG. 14B shows the timing where host data is accumulated into page buffer A then copied to AFB #6.

FIGS. 13A-B show the AFB tracking table for example C and FIGS. 14A-B.

Assume that six AFB blocks have stored valid data, as shown in FIG. 13A. The host sends a write request to the device with a target address=0111_0000. The current writing address does not match the target LSA of any AFB block in AFB tracking table 350.

Step 1: Receive a write request. The Multiple AFB Block Management sets CDF=1 and AMF=0. Receive two data sectors from the host, and write the sectors sequentially in Buffer A through Channel A.

Step 2: Start the flow chart of FIG. 9 to search for an available AFB block to copy the page buffer data into. FIG. 13A shows that all of the AFB blocks have stored valid data; none are empty and available.

Step 3: Duplicate the valid data stored in AFB Block 1 to the corresponding page of the target physical block.

Step 4: Remove the entry of AFB Block 1. (Details are shown in FIG. 10)

Step 5: Assign an available physical block to be AFB Block 6. Subsequently, duplicate the data sectors in Buffer A to AFB Block 6 through Channel A. Note that Steps 3 and 5 can be executed simultaneously by using different channels.

Step 6: Update the AFB tracking table, as shown in FIG. 13B. The entries in AFB tracking table 350 are moved up by one after the first entry is evicted, as shown in FIG. 13B.

FIG. 14A shows channel A being used to send host data in page buffer A of multi-page buffer 314 to AFB block #6, the last entry in AFB tracking table 350. The old data fragments in AFB block #1 is being evicted and copied to its target, physical block #1. FIG. 14B shows the timing where host data is accumulated into page buffer A then copied to AFB #6. Channel B is used to copy the old data fragments in AFB #6 to target block #1.

Since the process of Step 3 may consume much time, Step 5 can use another AFB block to improve the write performance without waiting for the end of Step 3. Note that Step 3 and 5 are executed simultaneously most of time. Hence, the timing diagram (FIG. 14B) shows again that the performance of random writes can be efficiently improved by using multiple AFB blocks.

This example shows that the first entry in AFB tracking table 350 will be removed first if necessary when all of the AFB blocks have stored valid data. this is because the AFB block of the first entry stores the oldest valid data while the block of the last entry stores the youngest data. In comparison to the youngest data, the target LSA of the oldest data has had many more times to match with different current writing addresses. Hence, the flow chart of FIG. 9 may evenly use the AFB blocks to duplicate random write data.

Example D

Figures 15A, 15B:
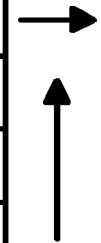
FIGS. 15A-B show the AFB tracking table for example D.

FIGS. 15A-B show the AFB tracking table for example D. Assume that three AFB blocks have stored valid data, as shown in FIG. 15A. In this example, the entry of AFB Block 3 needs to be removed from AFB tracking table 350.

Step 1: Start the flow chart of FIG. 10 to remove the third entry of AFB tracking table 350. (k=3 and N=6)

Step 2: Set bank_num=1034 and page_num=11.

Step 3: Duplicate the entry of AFB Block 4 to that of Block 3.

Step 4: Duplicate the entry of AFB Block 5 to that of Block 4.

Step 5: Duplicate the entry of AFB Block 6 to that of Block 5.

Step 6: Modify the entry of AFB Block 6 to change the physical block number and last page number to bank_num and page_num, respectively. Moreover, set the valid data flag to be zero. Finally, the modified AFB tracking table is shown in FIG. 15B.

After removing the entry of AFB Block 3, the order of available AFB blocks is assigned numbers 3 to 6. Note that the previously removed AFB block is the last used block. Hence, the system may averagely use the AFB blocks to duplicate random write data.

Applications

Figure 16A:
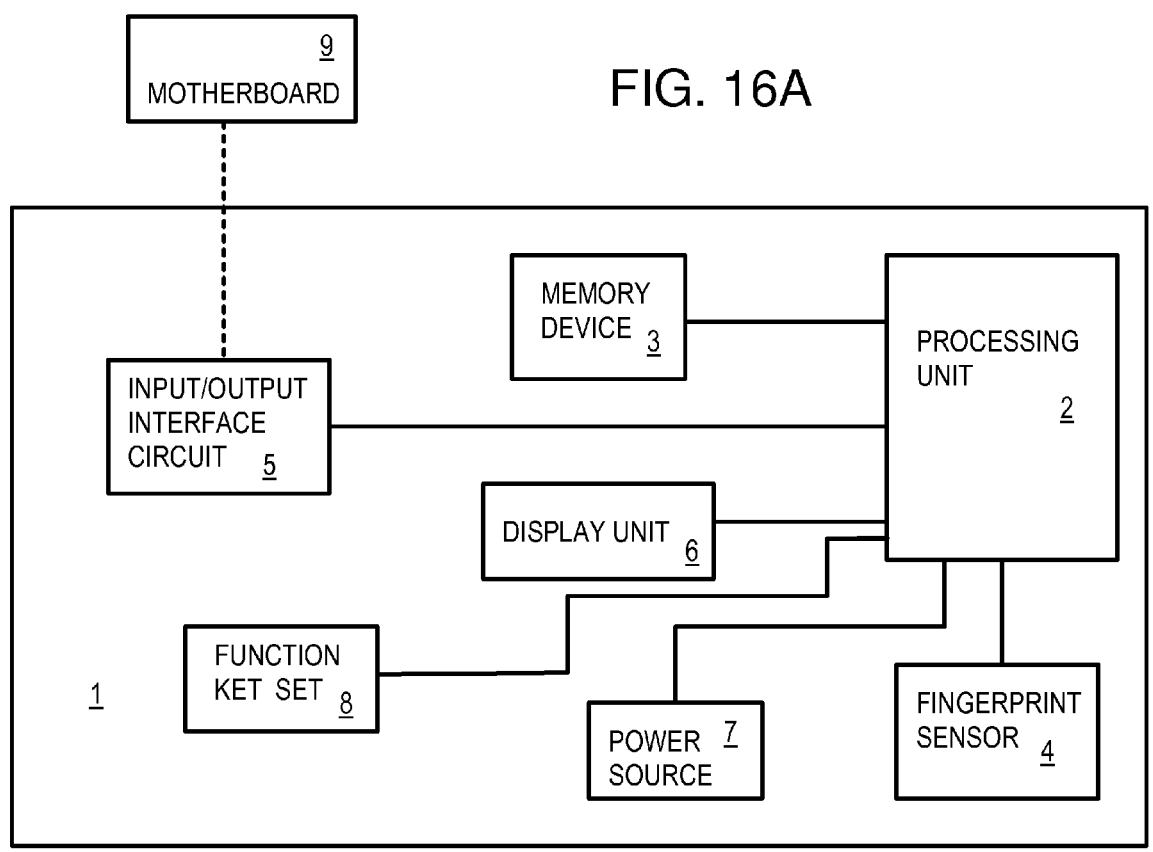
FIGS. 16A-F show various applications of an electronic data flash card as a portable flash device.

The parent application, now U.S. Pat. No. 7,257,714, disclosed an electronic data storage medium that had fingerprint verification capability. FIG. 16A shows an electronic data flash card. Electronic data flash card 10 is adapted to be accessed by motherboard or external (host) computer 9 either through interface bus 13 or card reader 12 or other interface mechanism (not shown), and includes card body 1, processing unit 2, one or more flash memory devices 3, fingerprint sensor 4, input/output interface circuit 5, optional display unit 6, optional power source (e.g., battery) 7, and optional function key set 8.

Flash memory device 3 is mounted on card body 1, stores in a known manner therein one or more data files, a reference password, and the reference fingerprint data obtained by scanning a fingerprint of one or more authorized users of electronic data flash card 10. Only authorized users can access the stored data files. The data file can be a picture file or a text file.

Fingerprint sensor 4 is mounted on card body 1, and is adapted to scan a fingerprint of a user of electronic data flash card 10 to generate fingerprint scan data. One example of fingerprint sensor 4 that can be used in the present invention is that disclosed in a co-owned U.S. Pat. No. 6,547,130, entitled "INTEGRATED CIRCUIT CARD WITH FINGER-PRINT VERIFICATION CAPABILITY", the entire disclosure of which is incorporated herein by reference.

The fingerprint sensor described in the above patent includes an array of scan cells that defines a fingerprint scanning area. The fingerprint scan data includes a plurality of scan line data obtained by scanning corresponding lines of array of scan cells. The lines of array of scan cells are scanned in a row direction as well as column direction of said array. Each of the scan cells generates a first logic signal upon detection of a ridge in the fingerprint of the holder of card body, and a second logic signal upon detection of a valley in the fingerprint of the holder of card body.

Input/output interface circuit 5 is mounted on card body 1, and can be activated so as to establish communication with host computer 9 by way of an appropriate socket via interface bus 13 or card reader 12. In one embodiment, input/output interface circuit 5 includes circuits and control logic associated with a Universal Serial Bus (USB), PCMCIA or RS232 interface structure that is connectable to an associated socket connected to or mounted on host computer 9. In another embodiment, input/output interface circuit 5 may include one of a Secure Digital (SD) interface circuit, a Multi-Media Card (MMC) interface circuit, a Compact Flash (CF) interface circuit, a Memory Stick (MS) interface circuit, a PCI-Express interface circuit, a Integrated Drive Electronics (IDE) interface circuit, and a Serial Advanced Technology Attachment (SATA) interface circuit, which interface with host computer 9 via interface bus 13 or card reader 12.

Processing unit 2 is mounted on card body 1, and is connected to flash memory device 3, fingerprint sensor 4 and input/output interface circuit 5 by way of associated conductive traces or wires disposed on card body 1. In one embodiment, processing unit 2 is one of an 8051, 8052, 80286 microprocessors available, for example, from Intel Corporation. In other embodiments, processing unit 2 includes a RISC, ARM, MIPS or other digital signal processors (DSP).

In accordance with an aspect of the present invention, processing unit 2 is controlled by a program stored at least partially in flash memory device 3 such that processing unit 2 is operable selectively in: (1) a programming mode, where processing unit 2 activates the input/output interface circuit 5 to receive the data file and the reference fingerprint data from host computer 9, and to store the data file and the reference fingerprint data in flash memory device 3; (2) a data retrieving mode, where processing unit 2 activates the input/output interface circuit 5 to transmit the data file stored in flash memory device 3 to host computer 9; and (3) a data resetting mode, where the data file and the reference finger data are erased from the flash memory device 3. In operation, host computer 9 sends write and read requests to electronic data flash card 10 via interface bus 13 or card reader 12 and input/output interface circuit 5 to processing unit 2, which in turn utilizes a flash memory controller (not shown) to read from or write to the associated one or more flash memory devices 3. In one embodiment, for further security protection, processing unit 2 automatically initiates operation in the data resetting mode upon detecting that a preset time period has elapsed since the last authorized access of the data file stored in the flash memory device 3.

Optional power source 7 is mounted on card body 1, and is connected to processing unit 2 and other associated units on card body 1 for supplying electrical power thereto.

Optional function key set 8, which is mounted on card body 1, is connected to processing unit 2, and is operable so as to initiate operation of processing unit 2 in a selected one of the programming, data retrieving and data resetting modes. The function key set 8 is operable to provide an input password to processing unit 2. Processing unit 2 compares the input password with the reference password stored in the flash memory device 3, and initiates authorized operation of electronic data flash card 10 upon verifying that the input password corresponds with the reference password.

Optional display unit 6 is mounted on card body 1, and is connected to and controlled by processing unit 2 for showing the data file exchanged with host computer 9 and for displaying the operating status of the electronic data flash card 10.

The following are some of the advantages of the present invention: first, the electronic data flash card has a small volume but a large storage capability, thereby resulting in convenience during data transfer; and second, because everyone has a unique fingerprint, the electronic data flash card only permits authorized persons to access the data files stored therein, thereby resulting in enhanced security.

Figure 16B:
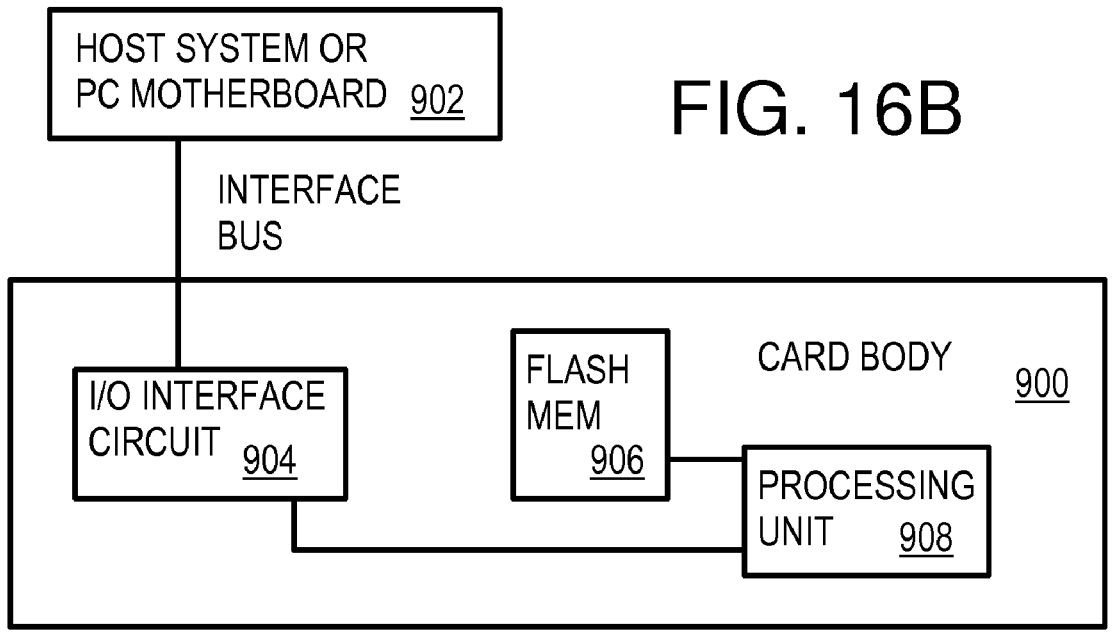

FIG. 16B shows an electronic data flash card in a card body as a portable flash device. Host system or PC motherboard 902 sends commands, addresses, and data over an interface bus to I/O interface circuit 904 on card body 900. These commands cause processing unit 908 to write, read, or erase blocks of flash memory 906. Card body 900 can be a plastic card body with a connector that fits into a slot on the host.

Figure 16C:
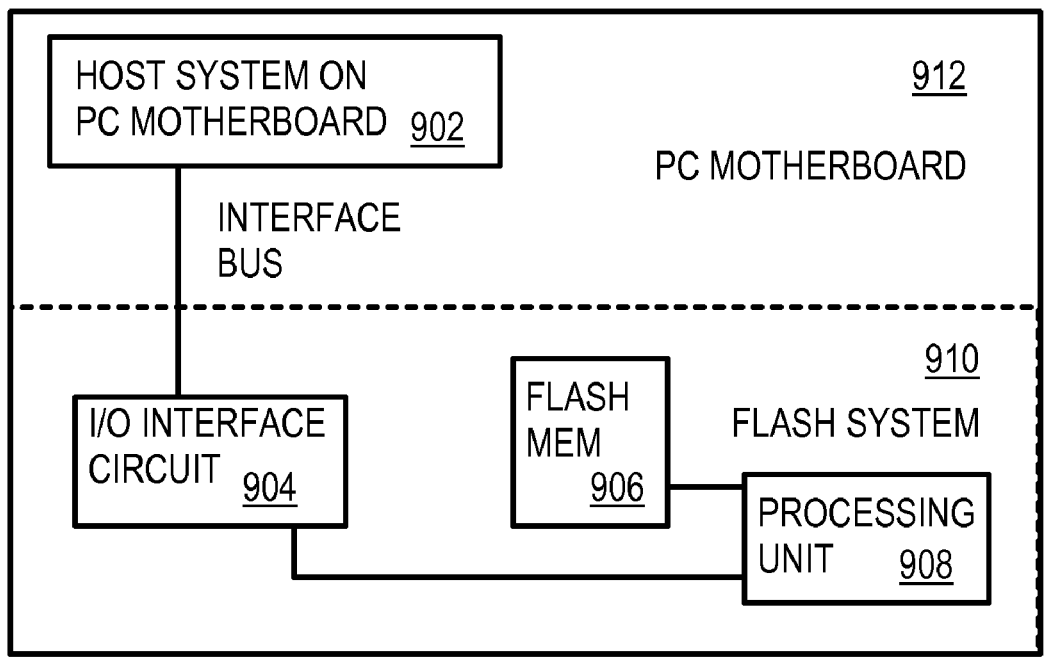

FIG. 16C shows an electronic data flash card integrated onto the PC motherboard. Host system or PC motherboard 902 sends commands, addresses, and data over an interface bus to I/O interface circuit 904 on flash system 910, which is a portion of motherboard 902. These commands cause processing unit 908 to write, read, or erase blocks of flash memory 906. Flash system 910 does not need a connector or a casing since it is integrated directly on the PC motherboard.

Figure 16D:
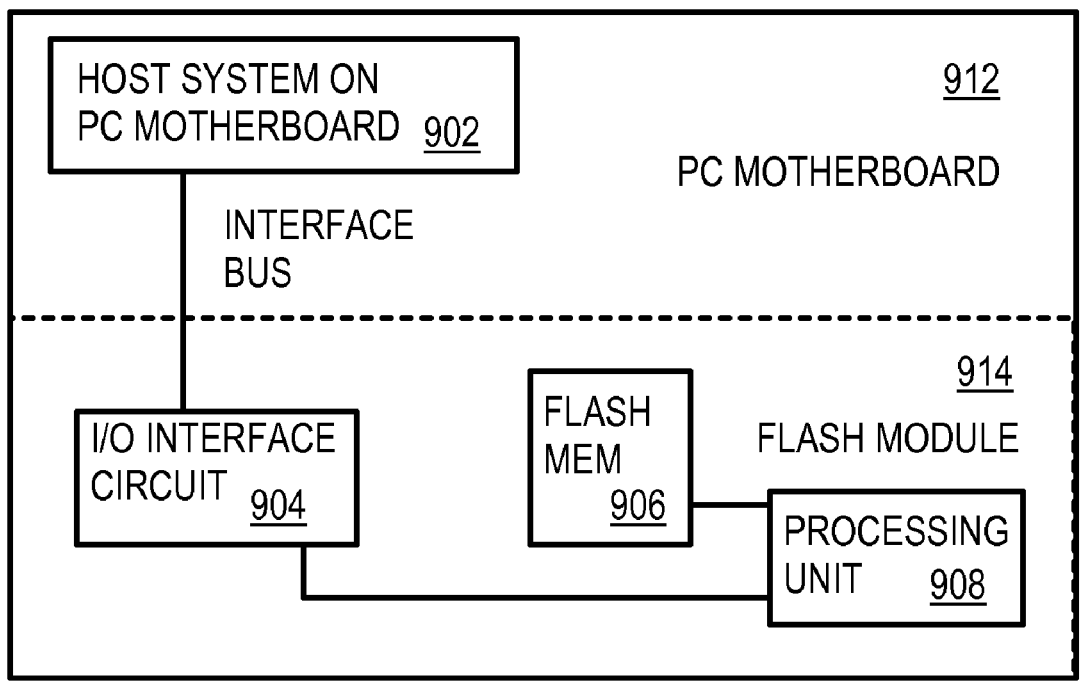

FIG. 16D shows an electronic data flash card in a flash module. Host system or PC motherboard 902 sends commands, addresses, and data over an interface bus to I/O interface circuit 904 on flash module 914. These commands cause processing unit 908 to write, read, or erase blocks of flash memory 906. Flash module 914 can be a printed-circuit-board-assembly (PCBA) that is mounted on the PC motherboard, or a module similar to a memory module that fits into a socket on the PC motherboard.

Figure 16E:
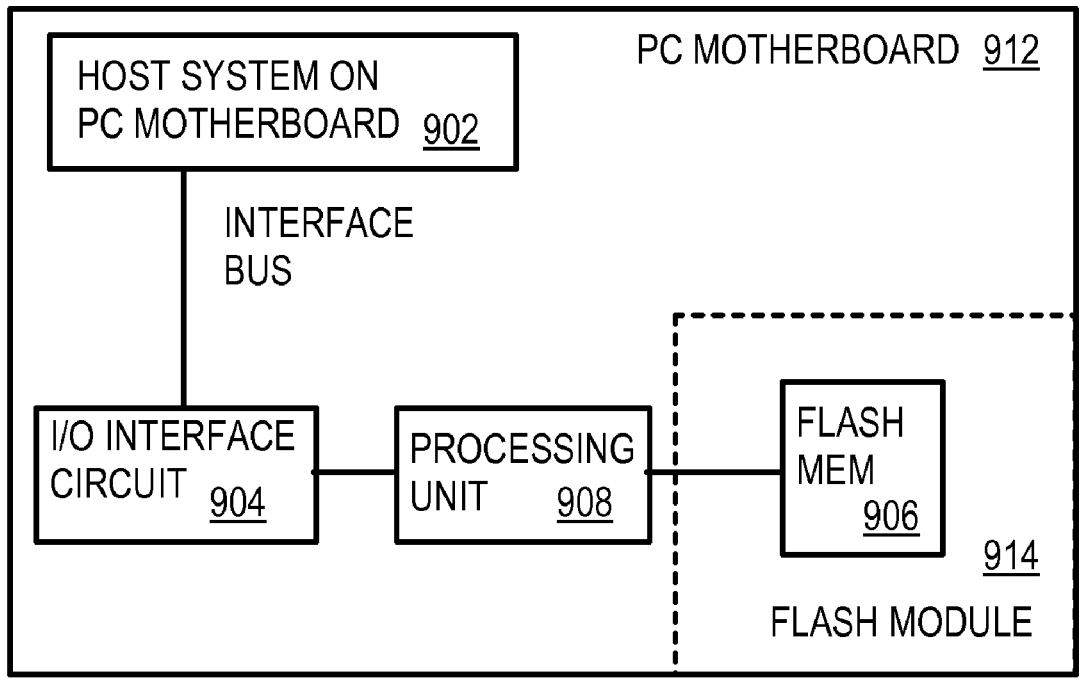

FIG. 16E shows an electronic data flash card in a flash module. Host system or PC motherboard 902 sends commands, addresses, and data over an interface bus to I/O interface circuit 904. These commands cause processing unit 908 to write, read, or erase blocks of flash memory 906 on flash module 914. Flash module 914 can be a printed-circuit-board-assembly (PCBA) that is mounted on the PC motherboard, or a module similar to a memory module that fits into a socket on the PC motherboard.

Figure 16F:
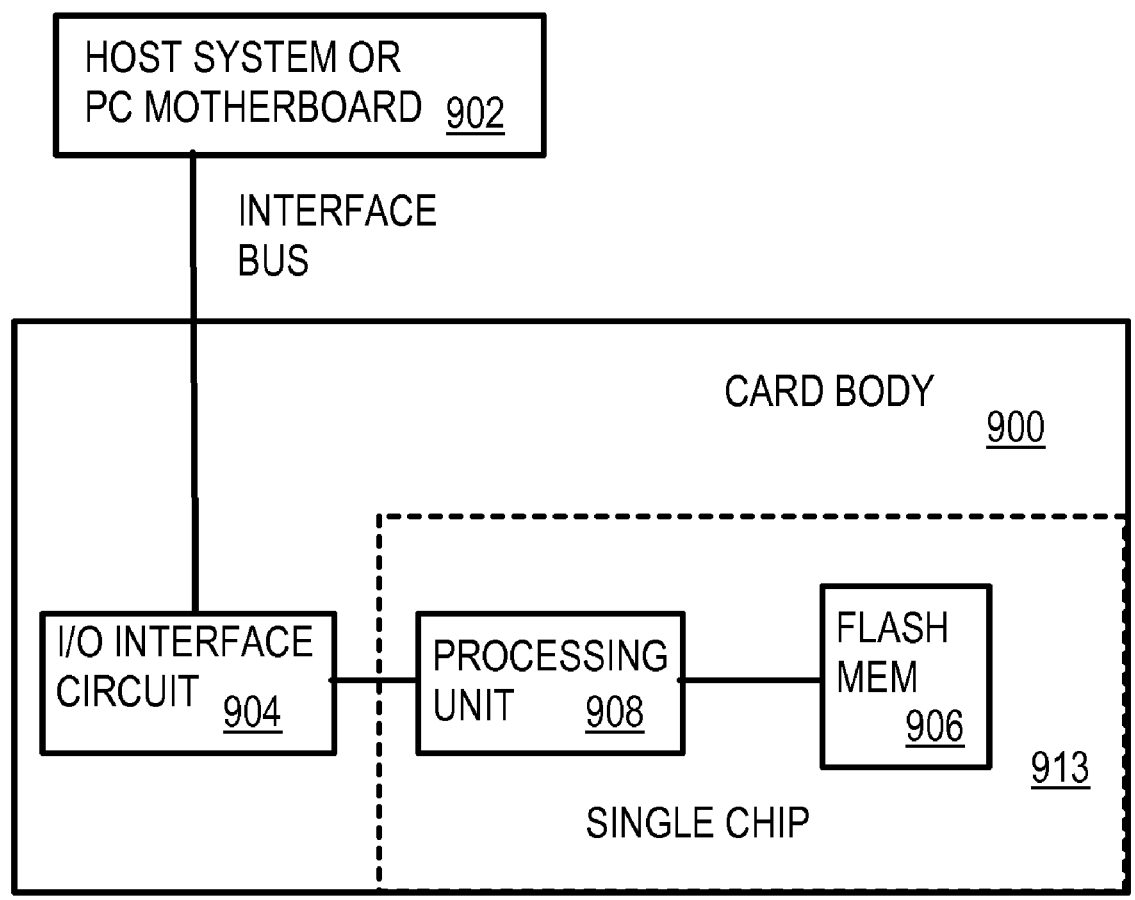

FIG. 16F shows a single chip or single package flash system. Host system or PC motherboard 902 sends commands, addresses, and data over an interface bus to I/O interface circuit 904. These commands cause processing unit 908 to write, read, or erase blocks of flash memory 906 on single chip or single package 913. The flash module can be a single chip or a single package with both processing unit 908 and flash memory 906. Card body 900 can be a plastic card body with a connector that fits into a slot on the host.

ALTERNATE EMBODIMENTS

Several other embodiments are contemplated by the inventors. While page buffer 26 has been described as holding one flash page of data, other buffer sizes could be substituted, such as a 2-page buffer, 4-page buffer, etc. Additional pipeline or temporary buffers and FIFO's could be added. Multi-page buffer 314 may be part of multi-channel controller processor 30, or may have separate page buffers 26 in each channel logic 28.

Each channel of flash may have its own AFB 20, or there may be fewer AFB's than channels, or multiple AFB's per channel. A single package, a single chip, or a multi-chip package may contain one or more of the plurality of channels of flash memory and/or the multi-channel controller processor.

MLC based NVMD may have four MLC chips with two parallel data channels, but different combinations may be used to form other NVMD's, for example, four, eight or more data channels, or eight, sixteen or more MLC chips. The NVMD and channels may be in chains, branches, or arrays. For example, a branch of 4 NVMD could connect as a chain to the NVMD controllers. Other size aggregation or partition schemes may be used for different access of the memory. Flash memory, a phase-change memory, or ferroelectric random-access memory (FRAM), Magnetoresistive RAM (MRAM), Memristor, PRAM, SONOS, Resistive RAM (RRAM), Racetrack memory, and nano RAM (NRAM) may be used.

The host can be a PC motherboard or other PC platform, a mobile communication device, a personal digital assistant (PDA), a digital camera, a combination device, or other device. The host bus or host-device interface can be SATA, PCIE, SD, USB, or other host bus, while the internal bus to the NVMD can be PATA, multi-channel SSD using multiple SD/MMC, compact flash (CF), USB, or other interfaces in parallel. The NVMD may be packaged in a TSOP, BGA, LGA, COB, PIP, SIP, or CSP packages. The internal bus may be fully or partially shared or may be separate buses. The NVMD PCBA system may use a circuit board with other components such as LED indicators, capacitors, resistors, etc.

Other bus protocols and physical connectors could be substituted, such as small-computer system interface (SCSI), compact flash (CF), Integrated Device Electronics (IDE), PCI Express, ExpressCard, Universal-Serial-Bus (USB), etc. A zero-insertion force (ZIF) connector could also be substituted.

Directional terms such as upper, lower, up, down, top, bottom, etc. are relative and changeable as the system or data is rotated, flipped over, etc. These terms are useful for describing the device but are not intended to be absolutes.

The NVMD may have a packaged controller and flash die in a single chip package that can be integrated either onto a PCBA, or directly onto the motherboard to further simplify the assembly, lower the manufacturing cost and reduce the overall thickness. The single-chip NVMD may use a logical-block address (LBA) addressing scheme, having an internal controller that converts the LBA to a physical internal address of the flash cells. LBA addresses from the host are passed through a bridge chip to one or more NVMD chips on a flash bus. A data traffic controller and timing dispatcher may work in conjunction with the bridge chip to maximize bandwidth and interleaving to the NVMD chips. NVDM chips could also be used with other embodiments including the open frame cards.

Rather than use the flash-drive device only for flash-memory storage, additional features may be added. For example, a music player may include a controller for playing audio from MP3 data stored in the flash memory. An audio jack may be added to the device to allow a user to plug in headphones to listen to the music. A wireless transmitter such as a BlueTooth transmitter may be added to the device to connect to wireless headphones rather than using the audio jack. Infrared transmitters such as for IRDA may also be added. A BlueTooth transceiver to a wireless mouse, PDA, keyboard, printer, digital camera, MP3 player, or other wireless device may also be added. The BlueTooth transceiver could replace the connector as the primary connector. A Bluetooth adapter device could have a connector, a RF (Radio Frequency) transceiver, a baseband controller, an antenna, a flash memory (EEPROM), a voltage regulator, a crystal, a LED (Light Emitted Diode), resistors, capacitors and inductors. These components may be mounted on the PCB before being enclosed into a plastic or metallic enclosure.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A multi-channel fragment-accumulating flash-memory system comprising:
   a multi-channel controller processor coupled to receive host data and a host address;
   a plurality of channels of flash memory coupled to the multi-channel controller processor;
   a plurality of Aggregating Flash Blocks (AFBs), including an AFB in each channel of the flash memory, the AFB being a physical block of the flash memory assigned for aggregating data fragments;
   a page buffer for each channel that accumulates a page of the host data before writing to the flash memory;
   an AFB tracking table having entries for the plurality of AFBs, an entry storing a physical block number that locates the AFB within the flash memory, a data valid flag indicating when the AFB is storing valid data, and a stored logical address;
   a multi-AFB manager that compares the host address to the stored logical address in entries in the AFB tracking table to locate a matching entry in the AFB tracking table, the multi-AFB manager assigning an assigned AFB pointed to by the physical block number of the matching entry;
   a combining process executed by the multi-channel controller processor when a page boundary of the page buffer is reached, the matching entry in the AFB tracking table is found by the multi-AFB manager, and the page buffer is not full, the combining process copying the host data in the page buffer and a data fragment read from the assigned AFB to a target physical block in the flash memory, whereby the data fragment stored in the assigned AFB is combined with the host data in the page buffer when writing to the target physical block.

2. The multi-channel fragment-accumulating flash-memory system of claim 1 further comprising:

a flush process executed by the multi-channel controller processor when a page boundary of the page buffer is reached, that copies the host data in the page buffer to a target physical block in the flash memory; and a STOP process executed by the multi-channel controller processor when a STOP command is received from a host, that copies the host data in the page buffer to a newly assigned AFB in the flash memory, and for updating the AFB tracking table for the newly assigned AFB.

3. The multi-channel fragment-accumulating flash-memory system of claim 2 wherein the AFB and the target physical block are both in a same channel of the flash memory, whereby fragment aggregation is performed on a per-channel basis.

4. The multi-channel fragment-accumulating flash-memory system of claim 3 wherein a page-size of the flash memory is a minimum amount of data that the flash memory is able to read;

wherein a block-size of the flash memory is a minimum amount of data that the flash memory is able to erase;

wherein the page buffer stores a page-size of data;

wherein the AFB and the target physical block each store a block-size of data;

wherein the block-size is at least 8 times the page-size;

wherein the page size is at least 1K bytes.

5. The multi-channel fragment-accumulating flash-memory system of claim 2 further comprising:

a single package, a single chip, or a multi-chip package that contains one or more of the plurality of channels of flash memory and the multi-channel controller processor.

6. The multi-channel fragment-accumulating flash-memory system of claim 2 further comprising:

an address correlation and page usage memory (ACPUM) that stores partial logical-to-physical address and page usage information (PLTPPUI) that indicate the target physical block corresponding to the host address, whereby the target physical block is located by looking up the host address in the ACPUM.

7. The multi-channel fragment-accumulating flash-memory system of claim 2 wherein the entry in the AFB tracking table also stores a last page number that locates valid data within the AFB pointed to by the physical block number of the entry.

8. A computer-implemented method for reducing wear of flash memory by aggregating writes in an Aggregating Flash Block (AFB) comprising:

receiving a host-write request from a host;

assigning the host-write request to an assigned channel of the flash memory;

storing host data from the host in a page buffer for the assigned channel;

comparing a host address from the host to a plurality of stored logical addresses for a plurality of Aggregating Flash Blocks (AFBs) in the flash memory to find a matching entry;

when no matching entry is found and a page boundary is reached in the page buffer, copying host data in the page buffer to a target physical block in the flash memory;

when the matching entry is found and a page boundary is reached in the page buffer, and the page buffer is full, copying host data in the page buffer to the target physical block in the flash memory; and when the matching entry is found and a page boundary is reached in the page buffer, and the page buffer is not full, copying host data in the page buffer to the target physical block in the flash memory and copying old data fragments in the AFB to the target physical block to combine host data with old data fragments to reduce data fragments, whereby host data is combined with old data fragments in the AFB to reduce wear due to additional data fragments.

9. The computer-implemented method of claim 8 further comprising:

setting sector update flags to indicate valid data in the page buffer;

using the sector update flags to locate valid data in the page buffer for copying to the target physical block, whereby sector update flags locate valid data in the page buffer.

10. The computer-implemented method of claim 8 further comprising:

when a stop command is received from the host, selecting a new AFB and copying host data in the page buffer to the new AFB in the flash memory.

11. The computer-implemented method of claim 10 further comprising:

reading the plurality of stored logical addresses from an AFB tracking table that has entries for each of the AFBs; and updating the AFB tracking table when the new AFB is selected.

12. The computer-implemented method of claim 11 wherein selecting the new AFB comprises for each entry in the AFB tracking table:

reading a data valid flag from the entry and skipping to a next entry in the AFB tracking table when the data valid flag is valid;

reading a status of a flash memory chip pointed to by the entry and skipping to the next entry in the AFB tracking table when the status is busy;

assigning an AFB pointed to by the entry as the new AFB when the data valid flag is not valid and the status is not busy; and assigning an AFB pointed to by a last entry in the AFB tracking table as the new AFB when no entry has the data valid flag not valid and the status not busy.

13. The computer-implemented method of claim 12 further comprising:

when no entry has the data valid flag not valid and the status not busy:

copying valid data in a first AFB pointed to by a first entry to a target physical block in the flash memory;

deleting the first entry in the AFB tracking table; and moving entries in the AFB tracking table up by one entry position.

14. The computer-implemented method of claim 8 further comprising:

updating an address correlation and page usage memory (ACPUM) when host data is written to the flash memory to track valid pages in the flash memory.

15. The computer-implemented method of claim 14 further comprising:
   when the address correlation and page usage memory (ACPUM) does not contain a partial logical-to-physical address and page usage information (PLTPPUI) for the host address, loading a corresponding partial logical-to-physical address and page usage information (PLTPPUI) from a PLTPPUI tracking table; and
   reading an address of the target physical block from the PLTPPUI in the ACPUM.

16. A page-accumulating and block-aggregating flash system comprising:
   a multi-channel controller coupled to receive host data and a host address;
   a plurality of channels of flash memory coupled to the multi-channel controller;
   a plurality of Aggregating Flash Blocks (AFBs), including an AFB in each channel of the flash memory, the AFB being a physical block of the flash memory assigned for aggregating old data fragments;
   a page buffer for each channel that accumulates a page of the host data before writing to the flash memory;
   an AFB tracking table that stores entries for each of the plurality of AFBs, the AFB tracking table having a plurality of stored logical addresses for old data fragments stored in the plurality of AFBs and a plurality of physical block numbers that locate the plurality of AFBs within the flash memory;
   compare means, reading the plurality of stored logical addresses from the AFB tracking table, for comparing the host address to the plurality of stored logical addresses to find a matching entry in the AFB tracking table;
   a non-combining buffer-flush process, activated when no matching entry is found and a page boundary is reached in the page buffer, and also activated when the matching entry is found and a page boundary is reached in the page buffer, and the page buffer is full, that copies host data in the page buffer to a target physical block in the flash memory; and
   a combining buffer-flush process, activated when the matching entry is found and a page boundary is reached in the page buffer, and the page buffer is not full, that copies host data in the page buffer to the target physical block in the flash memory and copies old data fragments in the AFB to the target physical block to combine host data with old data fragments to reduce old data fragments,
   whereby old data fragments are accumulated in the AFB and combined with accumulated host data when flushing the page buffer to the flash memory.

17. The page-accumulating and block-aggregating flash system of claim 16 wherein the old data fragments in the AFBs are stored in non-volatile flash memory while the host data accumulated in the page buffer is stored in a volatile memory.

18. The page-accumulating and block-aggregating flash system of claim 16 further comprising:
   a flush process, activated when a page boundary of the page buffer is reached, that copies the host data in the page buffer to a target physical block in the flash memory.

19. The page-accumulating and block-aggregating flash system of claim 16 further comprising:
   STOP process means, activated when a STOP command is received from a host, for copying the host data in the page buffer to a newly assigned AFB in the flash memory, and for updating the AFB tracking table for the newly assigned AFB.

20. The page-accumulating and block-aggregating flash system of claim 16 further comprising:
   address correlation and page usage memory (ACPUM) means for storing partial logical-to-physical address and page usage information (PLTPPUI) that indicates the target physical block corresponding to the host address,
   whereby the target physical block is located by looking up the host address in the ACPUM means.

21. The page-accumulating and block-aggregating flash system of claim 16 wherein each of the plurality of channels of flash memory further comprises:
   a single package, a single chip, or a multi-chip package;
   wherein each channel of flash memory is packaged in a single package, a single chip, or a multi-chip package.

* * * * *